United States Patent
Muramatsu et al.

(10) Patent No.: US 6,631,840 B1
(45) Date of Patent: Oct. 14, 2003

(54) TELEPHONE CHARGE MANAGEMENT SYSTEM

(76) Inventors: Yasuo Muramatsu, 37-4-605, Nihonbashi-Hakozakicho, Chuo-ku, Tokyo 103-0015 (JP); Masato Yokoi, 494, Hondacho 1-chome, Midori-ku, Chiba-shi, Chiba 266-0005 (JP)

(*) Notice: Subject to any disclaimer, the term of this patent is extended or adjusted under 35 U.S.C. 154(b) by 0 days.

(21) Appl. No.: 09/926,121

(22) PCT Filed: Mar. 8, 2000

(86) PCT No.: PCT/JP00/01382
§ 371 (c)(1),
(2), (4) Date: Sep. 6, 2001

(87) PCT Pub. No.: WO00/54490
PCT Pub. Date: Sep. 14, 2000

(30) Foreign Application Priority Data

Mar. 10, 1999 (JP) .............................. 11-62554
Oct. 22, 1999 (JP) ........................... 11-300546

(51) Int. Cl.⁷ .............................................. G06K 17/60
(52) U.S. Cl. ................... 235/379; 235/381; 379/144.06
(58) Field of Search ................................ 235/379, 375, 235/380, 381, 382, 462.01, 487, 492, 493, 494; 379/144.06, 144.16; 455/406, 408

(56) References Cited

U.S. PATENT DOCUMENTS

| | | | | |
|---|---|---|---|---|
| 5,777,305 A | | 7/1998 | Smith et al. | |
| 5,778,313 A | * | 7/1998 | Fougnies | 455/406 |
| 6,290,127 B1 | * | 9/2001 | Schilling | 235/382.5 |
| 6,463,139 B1 | * | 10/2002 | Davitt et al. | 379/144.01 |
| 6,501,837 B1 | * | 12/2002 | Adler et al. | 379/210.01 |
| 6,502,745 B1 | * | 1/2003 | Stimson et al. | 235/375 |
| 6,507,644 B1 | * | 1/2003 | Henderson et al. | 379/114.2 |

FOREIGN PATENT DOCUMENTS

| | | | | |
|---|---|---|---|---|
| EP | 1075134 | * | 5/1999 | G06F/19/00 |
| JP | 9-312708 | | 12/1997 | |
| WO | WO 99/46925 | | 9/1999 | |

\* cited by examiner

Primary Examiner—Daniel St. Cyr
(74) Attorney, Agent, or Firm—Oblons, Spivak, McClelland, Maier & Neustadt, P.C.

(57) ABSTRACT

A system including a cellular phone or a telephone card having, pre-registered therein, the identification number of a connection telephone company and a user ID, a store processing terminal unit handling it, a point-of-sale POS terminal, and a management host computer of the telephone company, wherein these are connected through a communication line. A merchandise information of the cellular phone that is transacted, etc., is sent to, and stored in, the host computer. When a call is made using the cellular phone, or the like, the host computer carries out reduction processing of a prepaid telephone charge depending upon a call rate on the basis of the stored merchandise information of the cellular phone, or the like. When the cellular phone or the telephone card is used, telephone charges can be paid in a store handling such a cellular phone, or the like.

23 Claims, 12 Drawing Sheets

FIG.6

| No. | Terminal ID | User ID | Merchandise code |
|---|---|---|---|
| 1 | A – 0001 | 81 # 11000772894 # | 5000 |
| 2 | A – 0001 | 81 # 12508612746 # | 1000 |
| 3 | A – 0001 | 81 # 98654000312 # | 3000 |
| 4 | B – 0001 | 81 # 99642863004 # | 1000 |
| 5 | B – 0001 | 81 # 12863559073 # | 5000 |

FIG.7

| User ID | No. | Tel. number called up | Call time period | Call charge | Remaining amount |
|---|---|---|---|---|---|
| 81 # 11000772894 # | 1 | 0 | 0 | 0 | 5000 |
| | 2 | 81953454 | 0 – 23 | 150 | 4850 |
| | 3 | 30230123 | 6 – 03 | 850 | 4000 |
| | 4 | 588847304 | 8 – 19 | 200 | 3800 |
| | 5 | 1616177093 | 0 – 58 | 100 | 3700 |
| | 6 | 51812083 | 10 – 27 | 550 | 3150 |

TELEPHONE CHARGE MANAGEMENT SYSTEM

FIELD OF THE INVENTION

The present invention relates to a cellular phone and a telephone card that have an identification number (user ID number) for identifying a phone user and are handled in a convenience store, or the like, a telephone call charge management system using such a cellular phone, etc., that are used for calls, and a payment system of a telephone bill in a convenience store, or the like.

DISCUSSION OF THE BACKGROUND

As one of special telephone cards with which international calls can be made, a prepaid card for international calls is conventionally available, which has an ID number and is easily obtained in a convenience store, or the like. This prepaid card is not inserted into a telephone machine unlike a telephone card, and a scratch portion on the reverse side of the card is peeled off and an ID number printed thereon is inputted in a telephone machine before making a call. A host computer of a card issuance company recognizes the ID number of each card, and reducing a remaining call time period depending upon a time period used for calling.

The above card is becoming popular and coming into greatly wide use, since it does not require any public telephone machine specialized for international calls and is easily usable with a general public telephone and even with PHS in order to make an international call.

However, the above card has the property of a cash voucher in that price information such as 1,000 yen, 3,000 yen or 5,000 yen is recorded in the card itself, so that it may often be an object for theft or may cause great loss when lost. A managing staff member of a convenience store, etc., dealing in such cards is required to handle them under strict control or store them in a safe for protecting them against robbery and loss. The above storing or management thus inevitably requires a large cost. Further, the high unit prices of the cards impose an excessive inventory cost on the store.

Moreover, the above card having the property of a cash voucher is also with problems of robbery and loss during transportation thereof, and transportation companies have shared a large transportation cost like transporting cash itself.

Not only a large monetary cost is required for storing and managing such cards as described above, but also it should not be overlooked that handling the expensive cash voucher-like cards by managing staff members of convenience stores, etc., which are open for business overnight imposes a straining intense responsibility on them.

SUMMARY OF THE INVENTION

It is an object of the present invention to provide a telephone charge payment managing system in which no useless burden is imposed on managing staff members of convenience stores, etc., by using cellular phones or telephone cards that have been now gaining great popularity.

According to an aspect of the present invention, there is provided a telephone charge management system mainly comprising a cellular phone having, pre-registered therein, at least identification numbers for identifying a connection telephone company and a phone user, and a store processing terminal unit placed in a store handling said cellular phone, wherein:

said connection telephone company has a management host computer for storing and managing information on said cellular phone that is transacted, said store processing terminal unit and said host computer are connected to each other through a communication line, and further, said store has a POS terminal for managing merchandise transacted in the store, further wherein:

said store processing terminal unit has, pre-registered, an identification code of said terminal and comprising a first input means for reading and loading said pre-registered identification numbers upon connection of said cellular phone thereto, a second input means for button-inputting a merchandise code and a transaction code, a storage means for storing merchandise information including said identification numbers, said merchandise code and said transaction code, inputted through the first and second input means, a central control means for constructing a electric data text of the merchandise information and the identification code of the terminal on the basis of said merchandise information stored, to be sent to said management host computer, a means for displaying a barcode that is specified by said merchandise code and the identification number of said connection telephone company and can be read with said POS terminal, and a communication control means for sending out a electric data text of the merchandise information and the identification code of the terminal to said management host computer to allow the management host computer to receive and store the electric data text, still further wherein:

when a call is made with said cellular phone, said host computer carries out deduction processing of a prepaid call charge depending upon a call rate on the basis of the stored merchandise information of said cellular phone.

According to an aspect of the present invention, there is provided a telephone charge management system mainly comprising a cellular phone having, pre-registered therein, at least identification numbers for identifying a connection telephone company and a phone user, and a store processing terminal unit placed in a store handling said cellular phone, wherein:

said connection telephone company has a management host computer for storing and managing information on said cellular phone that is transacted, said store processing terminal unit and said host computer are connected to each other through a communication line, and further, said store has a POS terminal for managing merchandise transacted in the store, further wherein:

said store processing terminal unit has, pre-registered, an identification code of said terminal and comprising a first input means for reading and loading said pre-registered identification numbers upon connection of said cellular phone thereto, a second input means for button-inputting a merchandise code and a transaction code, a storage means for storing merchandise information including said identification numbers, said merchandise code and said transaction code, inputted through the first and second input means, a central control means for constructing a electric data text for the POS terminal and constructing a electric data text of the merchandise information and the identification code of the terminal to be sent to said management host computer, on the basis of said merchandise information stored, an output means for outputting the electric data text for the POS terminal, constructed in said central control means, in the form of a barcode that can be read with the POS terminal, and a communication control means for sending out the electric data text of the merchandise information and the identification code of the terminal to said management host computer to allow the management host computer to receive and store the electric data text, still further wherein:

when a call is made with said cellular phone, said host computer carries out deduction processing of a prepaid call charge depending upon a call rate on the basis of the stored merchandise information of said cellular phone.

According to an aspect of the present invention, there is provided a telephone charge management system mainly comprising a cellular phone having, pre-registered therein, at least identification numbers for identifying a connection telephone company and a phone user, and a store processing terminal unit placed in a store handling said cellular phone, wherein:

said connection telephone company has a management host computer for storing and managing information on said cellular phone that is transacted, said store processing terminal unit and said host computer are connected to each other through a communication line, and further, said store has a POS terminal for managing merchandise transacted in the store, further wherein:

said store processing terminal unit has, pre-registered, an identification code of said terminal and comprising a first input means for reading and loading said pre-registered identification numbers upon connection of said cellular phone thereto, a second input means for button-inputting a merchandise code and a transaction code, a storage means for storing merchandise information including said identification numbers, said merchandise code and said transaction code, inputted through the first and second input means, a central control means for constructing a electric data text for the POS terminal, to be outputted to said POS terminal, and constructing a electric data text of the merchandise information and the identification code of the terminal, to be sent to said management host computer, on the basis of said merchandise information stored, a POS output means for outputting the electric data text for the POS terminal, constructed in said central control means, and a communication control means for sending out the electric data text of the merchandise information and the identification code of the terminal to said management host computer to allow the management host computer to receive and store the electric data text, still further wherein:

when a call is made with said cellular phone, said host computer carries out deduction processing of a prepaid call charge depending upon a call rate on the basis of the stored merchandise information on said cellular phone.

According to an aspect of the present invention, there is provided a telephone charge management system mainly comprising a telephone card having, pre-registered therein, at least identification numbers for identifying a connection telephone company and a phone user, and a store processing terminal unit placed in a store handling said telephone card, wherein:

said connection telephone company has a management host computer for storing and managing information on said telephone card that is transacted, said store processing terminal unit and said host computer are connected to each other through a communication line, and further, said store has a POS terminal for managing merchandise to be transacted in the store, further wherein:

said store processing terminal unit has, pre-registered, an identification code of said terminal and comprising a first input means for reading and loading said identification numbers recorded in said telephone card, a second input means for button-inputting a merchandise code and a transaction code, a storage means for storing merchandise information including said identification numbers, said merchandise code and said transaction code, inputted through the first and second input means, a central control means for constructing a electric data text of the merchandise information and the identification code of the terminal on the basis of said merchandise information stored, to be sent to said management host computer, a means for displaying a barcode that is specified by said merchandise code and the identification number of said connection telephone company and that can be read with the POS terminal, and a communication control means for sending out a electric data text of the merchandise information and the identification code of the terminal to said management host computer to allow the management host computer to receive and store the electric data text, still further wherein:

when a call is made on the basis of the identification numbers recorded in said telephone card, said host computer carries out deduction processing of a prepaid call charge depending upon a call rate on the basis of the stored merchandise information of said telephone card.

According to an aspect of the present invention, there is provided a telephone charge management system mainly comprising a telephone card having, pre-registered therein, at least identification numbers for identifying a connection telephone company and a phone user, and a store processing terminal unit placed in a store handling said telephone card, wherein:

said connection telephone company has a management host computer for storing and managing information on said telephone card that is transacted, said store processing terminal unit and said host computer are connected to each other through a communication line, and further, said store has a POS terminal for managing merchandise to be transacted in the store, further wherein:

said store processing terminal unit has, pre-registered, an identification code of said terminal and comprising a first input means for reading and loading said identification numbers recorded in said telephone card, a second input means for button-inputting a merchandise code and a transaction code, a storage means for storing merchandise information including said identification numbers, said merchandise code and said transaction code, inputted through the first and second input means, a central control means for constructing a electric data text for the POS terminal and constructing a electric data text of the merchandise information and the identification code of the terminal to be sent to said management host computer, on the basis of said merchandise information stored, an output means for outputting the electric data text for the POS terminal, constructed in said central control means, in the form of a barcode that can be read with the POS terminal, and a communication control means for sending out the electric data text of the merchandise information and the identification code of the terminal to said management host computer to allow the management host computer to receive and store the electric data text, still further wherein:

when a call is made on the basis of the identification numbers recorded in said telephone card, said host computer carries out deduction processing of a prepaid call charge depending upon a call rate on the basis of the stored merchandise information of said telephone card.

According to an aspect of the present invention, there is provided a telephone charge management system mainly comprising a telephone card having, pre-registered therein, at least identification numbers for identifying a connection telephone company and a phone user, and a store processing terminal unit placed in a store handling said telephone card, wherein:

said connection telephone company has a management host computer for storing and managing information on said telephone card that is transacted, said store processing terminal unit and said host computer are connected to each other through a communication line, and further, said store has a POS terminal for managing merchandise to be transacted in the store, further wherein:

said store processing terminal unit has, pre-registered, an identification code of said terminal and comprising a first input means for reading and loading said identification numbers recorded in said telephone card, a second input means for button-inputting a merchandise code and a transaction code, a storage means for storing merchandise information including said identification numbers, said merchandise code and said transaction code, inputted through the first and second input means, a central control means for constructing a electric data text for the POS terminal, to be outputted to said POS terminal, and constructing a electric data text of the merchandise information and the identification code of the terminal, to be sent to said management host computer, on the basis of said merchandise information stored, a POS output means for outputting the electric data text for the POS terminal, constructed in said central control means, and a communication control means for sending out the electric data text of the merchandise information and the identification code of the terminal to said management host computer to allow the management host computer to receive and store the electric data text, still further wherein:

when a call is made on the basis of the identification numbers recorded in said telephone card, said host computer carries out deduction processing of a prepaid call charge depending upon a call rate on the basis of the stored merchandise information of said telephone card.

According to an aspect of the present invention, there is provided a telephone charge management system, wherein the merchandise code is further recorded in the telephone card, said merchandise code is loaded with the first input means together with the identification number, and the transaction code is button-inputted with the second input means.

According to an aspect of the present invention, there is provided a telephone charge management system, wherein the communication control means encrypts the electric text to the management host computer and sends out the encrypted electric text.

According to an aspect of the present invention, there is provided a telephone charge management system, wherein the management host computer has an interface portion for receiving and decrypting the encrypted electric text sent out with the communication control means.

According to an aspect of the present invention, there is provided a telephone charge management system, wherein the communication line is a public telephone line.

According to an aspect of the present invention, there is provided a telephone charge management system mainly comprising a cellular phone having, pre-registered therein, at least identification numbers for identifying a connection telephone company and a phone user, and a store processing terminal unit placed in a store where a billed telephone charge with regard to said cellular phone can be paid, wherein:

said connection telephone company has a management host computer for storing and managing information on said cellular phone that is issued, said store processing terminal unit and said host computer are connected to each other through a communication line, and further, said store has a POS terminal for managing merchandise transacted in the store, further wherein:

said store processing terminal unit has, pre-registered, an identification code of said terminal and comprising a first input means for reading and loading said pre-registered identification numbers upon connection of said cellular phone thereto, a second input means for button-inputting a merchandise code and a transaction code, a storage means for storing merchandise information including said identification numbers, said merchandise code and said transaction code, inputted through the first and second input means, a central control means for constructing a electric data text for the POS terminal, to be outputted to said POS terminal, and constructing a electric data text of the merchandise information and the identification code of the terminal, to be sent to said management host computer, on the basis of said merchandise information stored, a POS output means for outputting the electric data text for the POS terminal, constructed in said central control means, and a communication control means for sending out the electric data text of the merchandise information and the identification code of the terminal to said management host computer to allow the management host computer to receive and store the electric data text, still further wherein:

when a call is made with said cellular phone, said host computer carries out addition processing of a call charge to bill depending upon a call rate on the basis of the information stored with regard to said cellular phone that is issued, telephone charges to bill are billed to said user after a certain period of time, and said billed telephone charges are paid in said store, followed by sending data of completion of the payment of the charges to said host computer from said store processing terminal unit.

According to an aspect of the present invention, there is provided a telephone charge management system, wherein:

when a call is made with said cellular phone, said host computer searches for information stored with regard to said cellular phone issued on the basis of the identification number of said user and carries out addition processing of a call charge to bill depending upon a call rate, telephone charges to bill are billed to said user after a certain period of time, and said billed telephone charges are paid in said store, followed by sending data of completion of the payment of the charges to said host computer from said store processing terminal unit.

According to an aspect of the present invention, there is provided a telephone charge management system mainly comprising a telephone card having, pre-recorded therein, at least identification numbers for identifying a connection telephone company and a phone user, and a store processing terminal unit placed in a store where a billed telephone charge with regard to said telephone card can be paid, wherein:

said connection telephone company has a management host computer for storing and managing information on said telephone card that is issued, said store processing terminal unit and said host computer are connected to each other through a communication line, and further, said store has a POS terminal for managing merchandise transacted in the store, further wherein:

said store processing terminal unit has, pre-registered, an identification code of said terminal and comprising a first input means for reading and loading said identification numbers recorded in said telephone card, a second input means for button-inputting a merchandise code and a transaction code, a storage means for storing merchandise information including said identification numbers, said merchandise code and said transaction code, inputted through the first and second input means, a central control means for constructing a electric data text for the POS terminal, to be outputted to said POS terminal, and constructing a electric data text of the merchandise information and the identification code of the terminal, to be sent to said management host computer, on the basis of said merchandise information stored, a POS output means for outputting the electric data text for the POS terminal, constructed in said central control means, and a communication control means for sending out the electric data text of the merchandise information and the identification code of the terminal to said management host computer to allow the management host computer to receive and store the electric data text, still further wherein:

when a call is made on the basis.of the identification numbers recorded in said telephone card, said host computer carries out addition processing of a call charge to bill depending upon a call rate on the basis of the information stored with regard to said telephone card that is issued, telephone charges to bill are billed to said user after a certain period of time, and said billed telephone charges are paid in said store, followed by sending data of completion of the payment of the charges to said host computer from said store processing terminal unit.

According to an aspect of the present invention, there is provided a telephone charge management system, wherein:
  when a call is made on the basis of the identification numbers recorded in said telephone card, said host computer searches for information stored with regard to said telephone card issued on the basis of the identification number of said user and carries out addition processing of a call charge to bill depending upon a call rate,
  telephone charges to bill are billed to said user after a certain period of time, and
  said billed telephone charges are paid in said store, followed by sending data of completion of the payment of the charges to said host computer from said store processing terminal unit.

According to an aspect of the present invention, there is provided a telephone charge management system mainly comprising a cellular phone having, pre-registered therein, at least identification numbers for identifying a connection telephone company and a phone user, and
  a store processing terminal unit, placed in a store handling said cellular phone, having an automatic teller machine unit having an automatic teller machine function,
  wherein:
    said connection telephone company has a management host computer for storing and managing information on said cellular phone that is transacted,
    said store processing terminal unit and said host computer are connected to each other through a communication line, and
    said automatic teller machine unit is connected to a host computer of a financial agency that manages the unit, through a communication line,
    further wherein:
      said store processing terminal unit has, pre-registered, an identification code of said terminal and comprising
        a first input means for reading and loading said pre-registered identification numbers upon connection of said cellular phone thereto,
        a second input means for button-inputting a merchandise code and a transaction code,
        a storage means for storing merchandise information including said identification numbers, said merchandise code and said transaction code, inputted through the first and second input means,
        a central control means for constructing a electric data text of the merchandise information and the identification code of the terminal on the basis of said merchandise information stored, to be sent to said management host computer, and
        a communication control means for sending out a electric data text of the merchandise information and the identification code of the terminal to said management host computer to allow the management host computer to receive and store the electric data text,
      still further wherein:
        when a call is made with said cellular phone, said host computer carries out deduction processing of a prepaid call charge depending upon a call rate on the basis of the stored merchandise information of said cellular phone.

According to an aspect of the present invention, there is provided a telephone charge management system mainly comprising a telephone card having, pre-recorded therein, at least identification numbers for identifying a connection telephone company and a phone user, and
  a store processing terminal unit, placed in a store handling said telephone card, having an automatic teller machine unit having an automatic teller machine function,
  wherein:
    said connection telephone company has a management host computer for storing and managing information on said telephone card that is transacted,
    said store processing terminal unit and said host computer are connected to each other through a communication line, and
    said automatic teller machine unit is connected to a host computer of a financial agency that manages the unit, through a communication line,
    further wherein:
      said store processing terminal unit has, pre-registered, an identification code of said terminal and comprising
        a first input means for reading and loading said identification numbers recorded in said telephone card,
        a second input means for button-inputting a merchandise code and a transaction code,
        a storage means for storing merchandise information including said identification numbers, said merchandise code and said transaction code, inputted through the first and second input means,
        a central control means for constructing a electric data text of the merchandise information and the identification code of the terminal on the basis of said merchandise information stored, to be sent to said management host computer, and
        a communication control means for sending out a electric data text of the merchandise information and the identification code of the terminal to said management host computer to allow the management host computer to receive and store the electric data text,
      still further wherein:
        when a call is made on the basis of the identification numbers recorded in said telephone card, said host computer carries out deduction processing of a prepaid call charge depending upon a call rate on the basis of the stored merchandise information of said telephone card.

According to an aspect of the present invention, there is provided a telephone charge management system, wherein an account of said connection telephone company is opened in the host computer of the financial agency.

According to an aspect of the present invention, there is provided a telephone charge management system mainly comprising a cellular phone having, pre-registered therein, at least identification numbers for identifying a connection telephone company and a phone user, and
  a store processing terminal unit, placed in a store where a bill of telephone charges with regard to said cellular phone can be paid, having an automatic teller machine unit having an automatic teller machine function,
  wherein:
    said connection telephone company has a management host computer for storing and managing information on said cellular phone that is issued, said store processing terminal unit and said host computer are connected to each other through a communication line, and said automatic teller machine unit is connected to a host computer of a financial agency that manages the unit, through a communication line, further wherein:

said store processing terminal unit has, pre-registered, an identification code of said terminal and comprising a first input means for reading and loading said pre-registered identification numbers upon connection of said cellular phone thereto, a second input means for button-inputting a merchandise code and a transaction code, a storage means for storing merchandise information including said identification numbers, said merchandise code and said transaction code, inputted through the first and second input means, a central control means for constructing a electric data text of the merchandise information and the identification code of the terminal on the basis of said merchandise information stored, to be sent to said management host computer, and a communication control means for sending out a electric data text of the merchandise information and the identification code of the terminal to said management host computer to allow the management host computer to receive and store the electric data text, still further wherein:

when a call is made with said cellular phone, said host computer carries out addition processing of a call charge to bill depending upon a call rate on the basis of the information stored with regard to said cellular phone that is issued, telephone charges to bill are billed to said user after a certain period of time, and said billed telephone charges are paid through the store processing terminal unit having an automatic teller machine unit having an automatic teller machine function, followed by sending data of completion of the payment of the charges to said host computer from said store processing terminal unit.

According to an aspect of the present invention, there is provided a telephone charge management system mainly comprising a telephone card having, pre-recorded therein, at least identification numbers for identifying a connection telephone company and a phone user, and a store processing terminal unit, placed in a store where a bill of telephone charges with regard to said telephone card can be paid, having an automatic teller machine unit having an automatic teller machine function, wherein:

said connection telephone company has a management host computer for storing and managing information on said telephone card that is issued, said store processing terminal unit and said host computer are connected to each other through a communication line, and said automatic teller machine unit is connected to a host computer of a financial agency that manages the unit, through a communication line, further wherein:

said store processing terminal unit has, pre-registered, an identification code of said terminal and comprising a first input means for reading and loading said identification numbers recorded in said telephone card, a second input means for button-inputting a merchandise code and a transaction code, a storage means for storing merchandise information including said identification numbers, said merchandise code and said transaction code, inputted through the first and second input means, a central control means for constructing a electric data text of the merchandise information and the identification code of the terminal on the basis of said merchandise information stored, to be sent to said management host computer, and a communication control means for sending out a electric data text of the merchandise information and the identification code of the terminal to said management host computer to allow the management host computer to receive and store the electric data text, still further wherein:

when a call is made using the identification numbers recorded in said telephone card, said host computer carries out addition processing of a call charge to bill depending upon a call rate on the basis of the information stored with regard to said telephone card that is issued, telephone charges to bill are billed to said user after a certain period of time, and said billed telephone charges are paid through the store processing terminal unit that have an automatic teller machine unit having an automatic teller machine function, followed by sending data of completion of the payment of the charges to said host computer from said store processing terminal unit.

According to an aspect of the present invention, there is provided a telephone charge management system, wherein an account of said connection telephone company is opened in the host computer of the financial agency.

According to an aspect of the present invention, there is provided a telephone charge management system, wherein the telephone card is a card selected from an IC card, a magnetic card and a barcode card.

According to an aspect of the present invention, there is provided a telephone charge management system, wherein:

when a call using said cellular phone is made or a call is made on the basis of the identification numbers recorded in said telephone card, said host computer searches for information stored with regard to said cellular phone or said telephone card that is issued, on the basis of the identification number of said user, and carries out addition processing of a call charge to bill depending upon a call rate, telephone charges to bill are billed to said user after a certain period of time, and said billed telephone charges are paid through the store processing terminal unit that have an automatic teller machine unit having an automatic teller machine function, followed by sending data of completion of the payment of the charges to said host computer from said store processing terminal unit.

According to an aspect of the present invention, there is provided a telephone charge management system, wherein the cellular phone is used in a state where an IC card is fitted to the cellular phone, the IC card having, pre-registered, the identification numbers for identifying the connection telephone company and the phone user, and the 20 cellular phone and the store processing terminal unit are connected to each other by connecting said IC card.

BRIEF DESCRIPTION OF DRAWINGS

FIG. 6 shows a format of user ID registration files.

FIG. 7 shows a format of charged amount management file.

Figure 1:
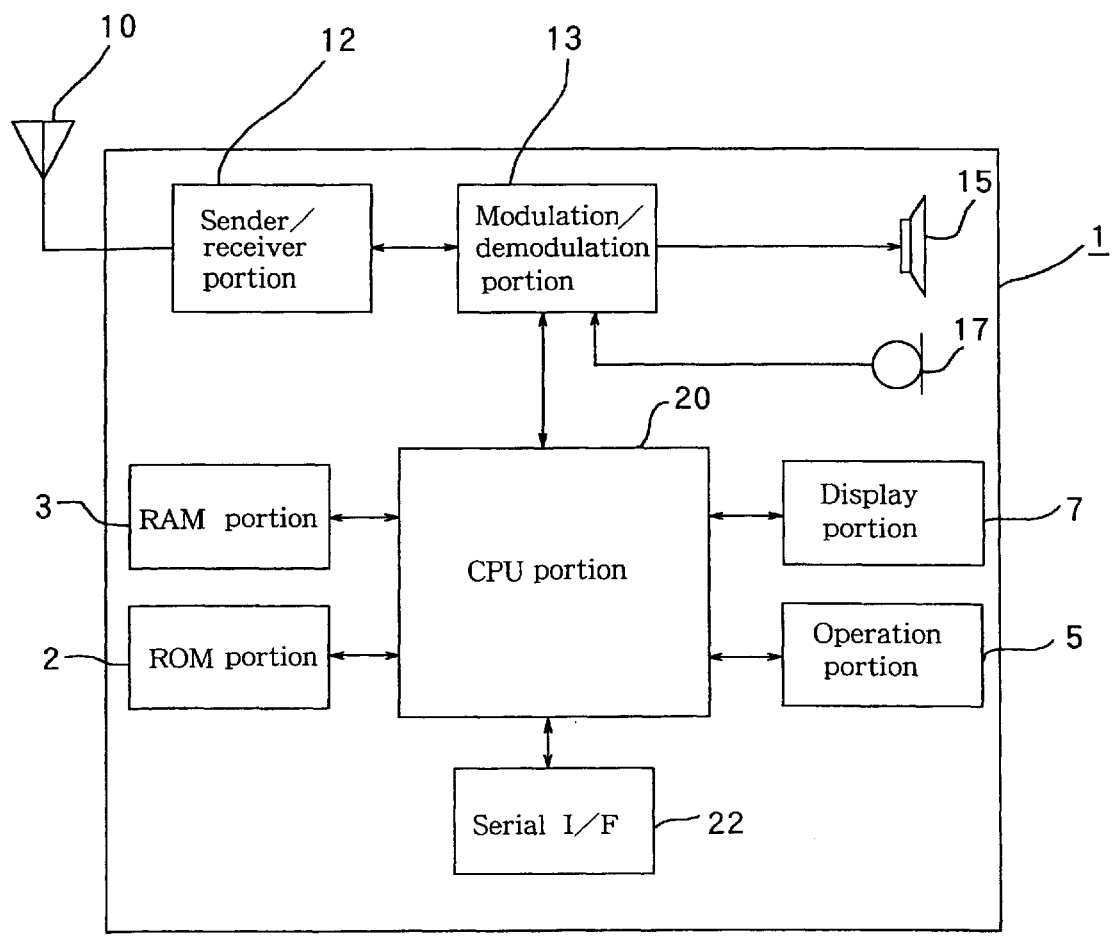
FIG. 1 is a block diagram showing a constitution of a cellular phone.

In the drawings, numeral 1 shows a cellular phone, 1' shows a telephone card, 2 shows a ROM portion, 3 shows a RAM portion, 5 shows an operation portion, 7 shows a display portion, 10 shows an antenna, 12 shows a sender/receiver portion, 13 shows a modulation/demodulation portion, 15 shows a speaker, 17 shows a microphone, 20 shows a central processing unit (CPU portion), 21 shows a base station of a connection telephone company, 23 shows a switchboard of a connection telephone company, 25 shows a general telephone network, 27 shows a terminal of a person to whom a call is made, 30 shows a store processing terminal unit, 30' shows a terminal unit, 33 shows an first input means, 33' shows an interface, 35 shows a second input means, 37 shows a storage means (RAM portion), 38 shows a central control means, 39 shows an output means for outputting electric data text for a POS terminal, 39' shows an output means for outputting merchandise code data, 40 shows a POS terminal, 41 shows a communication control means, 45 shows an IC card, 45' shows an IC chip module, 46 shows a magnetic card, 46' shows a magnetic stripe, 47 shows a barcode card, 47' shows a barcode, 50 shows an ATM unit, 53 shows a card reader means, 55 shows a display means, 57 shows a paper money handling means, 59 shows a coin handling means, 60 shows an ATM central control means, 63 shows a cash management means, 65 shows an ATM storage means, 67 shows an ATM communication control means, 69 shows a card insertion slot, 69' shows an insertion slot for bills, etc., 70 shows a bankbook insertion slot, 71 shows a paper money in and out port, 73 shows a coin in and out port, 75 shows a touch panel display portion, 100 shows a management host computer of a connection telephone company, 100' shows a managing host computer of another connection telephone company, 100" shows a management host computer of still another connection telephone company, 100''' shows a management host computer of yet another connection telephone company, 103 shows a host central control means, 105 shows a host management memory, 107 shows a host billed-amount management means, 109 shows an interface portion of the host computer, 109' shows an operational management computer, 200 shows a management host computer of a bank, 201 shows a bank communication control means, 203 shows an account management file, 208 shows a bank central control means, 203-1 shows a customer account of an intending purchaser, 203-2 shows an account of a connection telephone company, L shows an electric data text of a merchandise code to be outputted to the POS terminal, M shows an electric data text of merchandise information, etc., to be sent to the host computer, 5a shows a numeric keypad, 5b shows function keys, 5c shows function keys, 7a shows a display screen such as a liquid crystal display, and 22a shows an external connection terminal.

PREFERRED EMBODIMENTS OF THE INVENTION

Working embodiments of the present invention will be specifically explained below.

(Cellular Phone)

The cellular phone used in the telephone charge management system of the present invention will be explained first.

The cellular phone for use in the present invention is a telephone in which ① at least identification numbers for identifying a connection telephone company and a phone user are registered beforehand.

Figure 2:
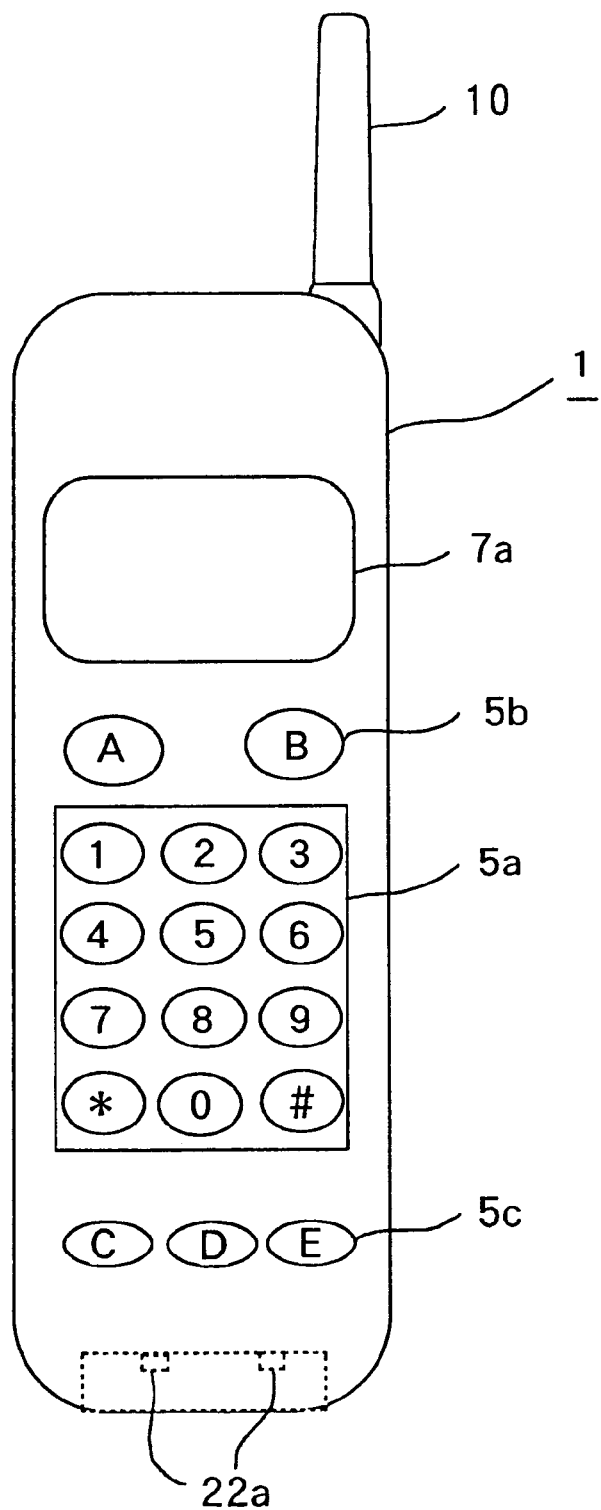
FIG. 2 is a front view of a cellular phone.

FIG. 1 is a block diagram of one example of constitution of the above cellular phone 1, and FIG. 2 is a front view of one example of the cellular phone.

In FIG. 1, numeral 2 shows a ROM portion having OS and a control program registered therein, and also having, registered therein, at least identification numbers for identifying a connection telephone company (the "telephone company" refers to a telephone company that issues the cellular phone and carries out reduction from an allocated amount or charging depending upon the time period of calls through the cellular phone) and a phone user. Numeral 3 shows a RAM portion, which is a memory portion where a phone user can store and register a reply message and telephone numbers of persons to whom calls are made as speed calling numbers. Further, the RAM portion can store message received in a user's absence and redial data and can further store a call history and a history of arrived messages. Numeral 5 shows an operation portion through which a user keys in a telephone number of a person to whom a call is made and various functions, and 7 shows a display portion for displaying a telephone number, a message and a content of an input guidance.

Numeral 10 shows an antenna, 12 shows a sender/receiver portion for carrying out transmission and reception of electric waves, 13 shows a modulation/demodulation portion for modulating sound waves (voice signals) to be sent out and demodulating received electric waves, 15 shows a speaker for outputting received voice signals, and 17 shows a microphone through which voice signals to be sent out are inputted.

Numeral 20 shows a central processing unit (CPU portion), and it conducts all of inputting of a voice message, registered telephone numbers, etc., in the RAM portion, readout of an OS, a control program and telephone numbers, etc., stored in the ROM portion or RAM portion, controlling of sending and receiving of a communication protocol and electric waves in the transmitting/receiving portion, controlling of modulation/demodulation of sound waves in the modulation/demodulation portion and controlling of input/output of voices through the speaker or the microphone.

Numeral 22 is a serial interface (I/F) such as an external connection terminal, etc., and various signals are inputted from, and outputted to, other terminal unit or an external personal computer. This connection can be made through a cable such as RC-232C.

FIG. 2 shows a front view of one example of the cellular phone in the present invention. The cellular phone is not especially functionally limited. It can be selected from known cellular phones that are generally available.

Numeral 10 shows an antenna, 7a shows a liquid crystal (LCD) screen for displaying a telephone number, etc., with the display portion 7, 5a shows a numeric keypad having ten keys and function keys corresponding to the operation portion 5, and 5b and 5c show function keys regarding a power source, volume level, holding of call, clearing, registration of speed calling numbers, and the like.

Further, a connection terminal 22a constituting the serial I/F is provided in a bottom portion, or the like.

In FIG. 1, the cellular phone is explained as one having the constitution of an analog cellular phone. Naturally, the cellular phone shall not be limited thereto, and it may be a digital cellular phone. That is, the cellular phone in the present invention makes no distinction between analog and digital system phone, and it includes a usual cellular phone, a personal handy-phone system called PHS and a car telephone, and in addition to these, it also includes general mobile communication devices such as a so-called mobile terminal and PDA.

Therefore, "a case where a telephone call is made with a cellular phone" in the present invention includes not only a telephone call (communication) with voices but also data telecommunication.

As described above, the cellular phone used in the present invention has at least an identification number of a connection telephone company and an identification number that specifies a phone user (to be also referred to as "user ID" hereinafter) registered in the ROM portion thereof, and a store that handles the cellular phone, such as a convenience store, handles payment of telephone call charges.

(Store Processing Terminal Unit Placed in a Store Handling Cellular Phone)

A store that handles the above cellular phone has a store processing terminal unit for processing identification numbers specifying the connection telephone company and.the phone user and merchandise information such as a merchandise code and a transaction code with regard to the cellular phone.

The above store is, for example, a convenience store as described above and generally sells thousands to tens of thousands of goods. Sales information data of sold merchandise are reported to a head office that is a franchiser one by one through a line such as telephone line. And, the head office grasps what merchandise are so-called hot-selling items moment by moment, so that it gathers and keeps items of goods and develops merchandise to meet with needs of consumers, and it further conducts consumer management. The above merchandise management is a well-known POS (point of sale system).

Generally, each store has a register to which a barcode reader is connected, and the register also works as a POS terminal. Generally, merchandise information data inputted on the basis of a barcode is sent to the head office of the store through another computer of the store and a modem and through a communication line such as a telephone line.

Figure 3:
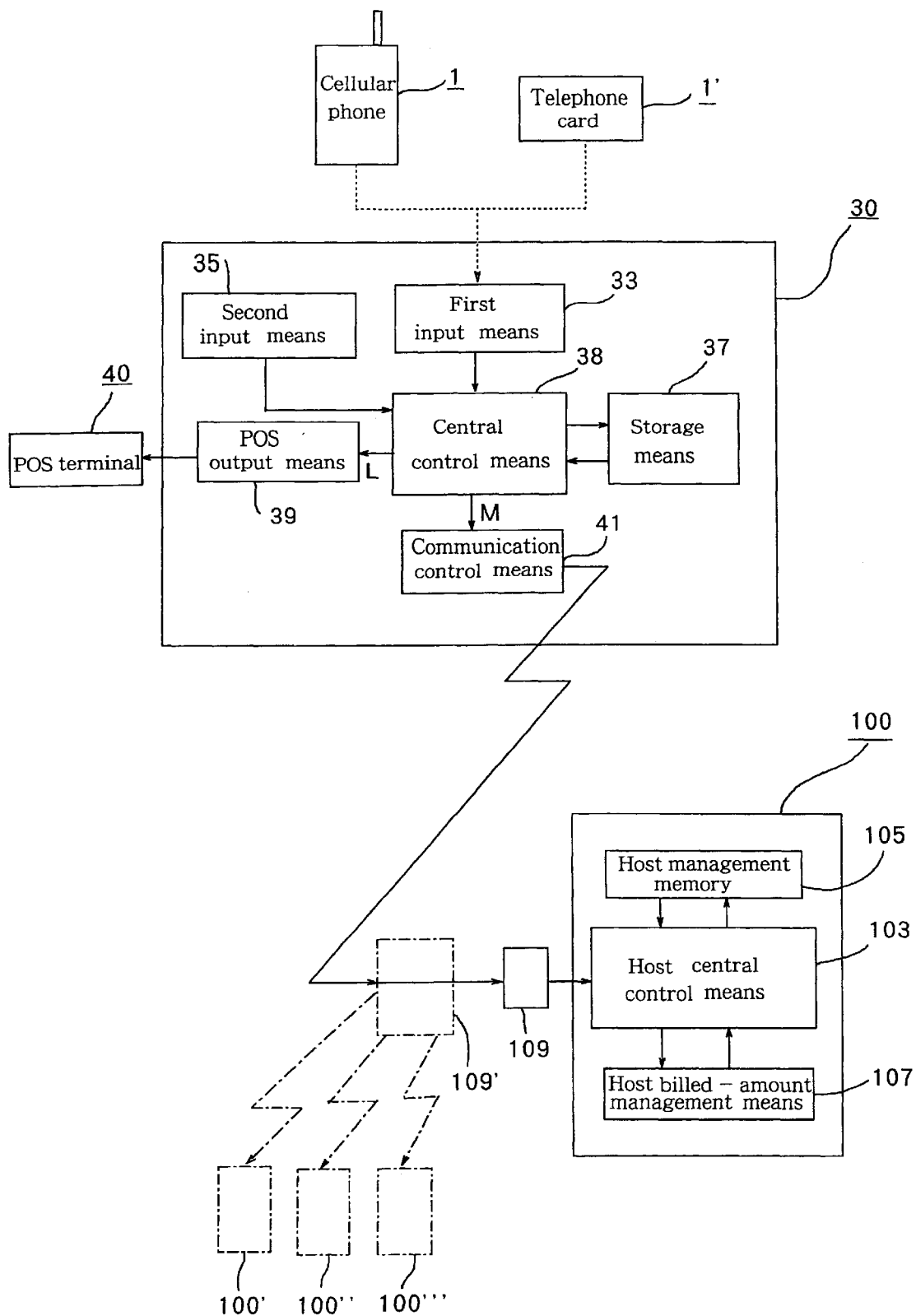
FIG. 3 is a block diagram showing a constitution of a store processing terminal unit.
Figure 5:
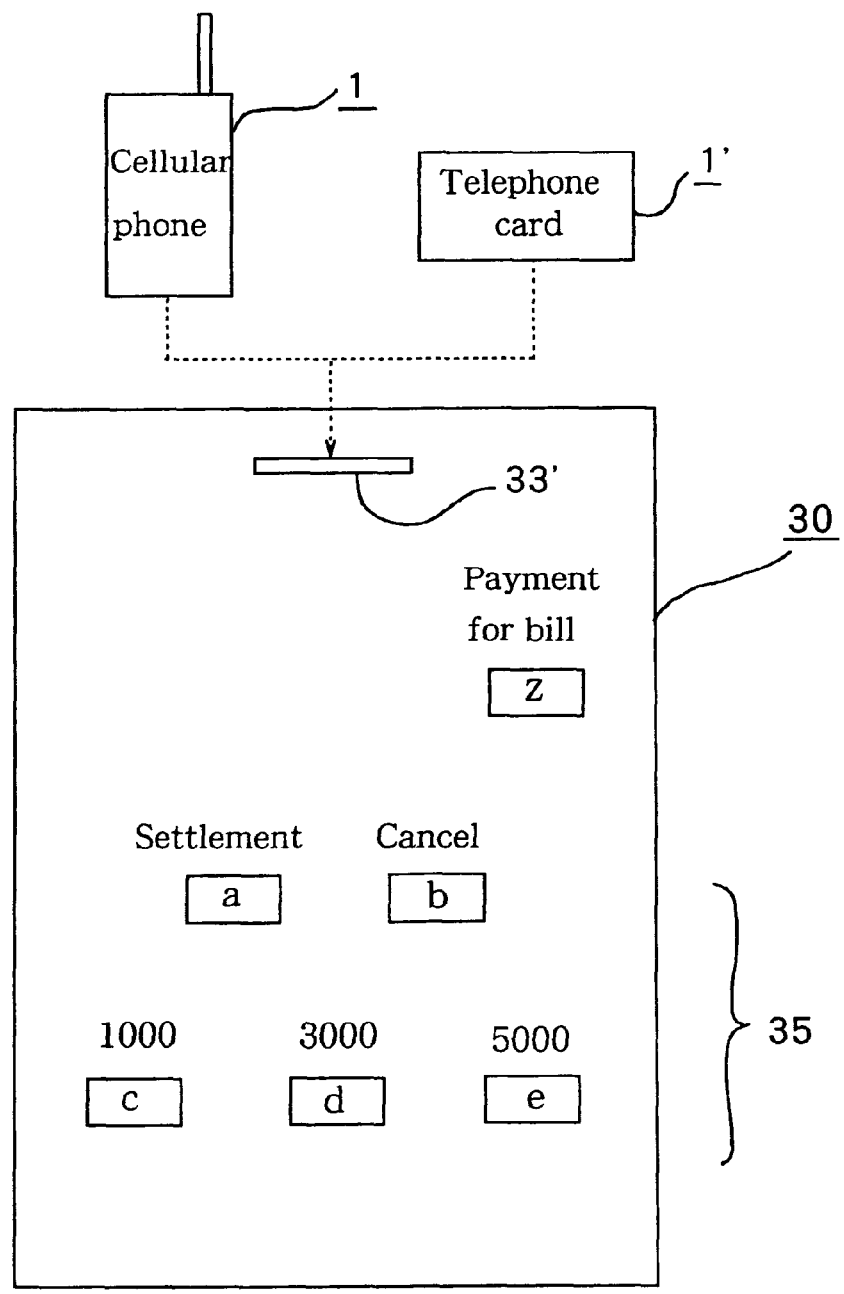
FIG. 5 is a front view of the store processing terminal unit.

FIG. 3 shows a block diagram showing one example of constitution of a store processing terminal unit 30, and FIG. 5 shows a front view thereof showing one example of an input button layout (a, b, c, d, e, z, etc.). Such an input button may be a push button switch or may be a touch switch (touch panel) on a liquid crystal display screen.

Further, numeral 40 shows a POS terminal placed in each store, and 100 shows a management host computer of a connection telephone company. The host computer totally stores and manages information of each cellular phone with which an issuance and/or a transaction are/is made, as will be discussed later.

In FIG. 3, the above terminal unit 30 has the following constitution. That is, the terminal unit 30 has the identification code (to be also referred to as "terminal ID" hereinafter) registered beforehand and mainly comprises a first input means 33 for reading and inputting the identification number pre-registered in the ROM portion of a cellular phone when the above cellular phone 1 is connected, a second input means 35 for button-inputting a merchandise code and a transaction code, a storage means 37 for storing merchandise information including the above identification number, merchandise code and transaction code inputted through the first and second input means, a central control means 38 for constructing a electric data text for the POS terminal, which electric text is to be outputted to the POS terminal 40 of the above store, and a electric data text of the merchandise information and the identification code of the terminal, which electric text is to be sent to the above management host computer 100, on the basis of the above stored merchandise information, a POS output means 39 for outputting the electric data text for the POS terminal, which electric text has been constructed in the above central control means, and a communication control means 41 for sending out the electric data text of merchandise information and the identification code of the terminal to the above management host computer so that these data are received and stored.

The storage means 37 comprises a ROM portion and a RAM portion. Generally, the identification code of the terminal is pre-stored in the ROM portion, and the above identification number and the merchandise information including a merchandise code and a transaction code, inputted through the first and second input means, are stored in the RAM portion.

In the present invention, it is not necessarily required to constitute one POS terminal and one store processing terminal unit as physically separated ones. The POS terminal and the store processing terminal unit can be integrated into one unit by incorporating the above store processing terminal unit into the POS terminal.

(Operation of Terminal in Handling in Said Store)

Receipt (payment) for a telephone charge when a cellular phone is used is made with the above store processing terminal unit 30 in the following manner.

When a customer who wishes to pay for a telephone charge of a cellular phone comes for the payment, a salesperson in charge in the store (to be referred to as "salesperson in charge" hereinafter) connects the cellular phone 1 to the interface 33' of the first input means 33 of the store processing terminal unit 30 in FIG. 5 through the serial interface 22 thereof.

The method of the above connection is not specially limited. For example, the connection is made by inserting a connector or the like that is a connection terminal of the terminal unit side into the external connection terminal 22a (e.g., connector for input and output of various signals) which is provided, for example, in the bottom surface of the cellular phone, or the connection may be made in a contact-free method using an infrared signal, etc. For securing the better connection, there may be employed a method in which the terminal unit is provided with a slot for a cellular phone and the connection of the cellular phone is made while it is inserted and held.

As described above, the above cellular phone 1 is connected to the first input means 33, whereby the identification numbers for identifying the connection telephone company and the phone user, pre-registered in the ROM portion 2 of the cellular phone, are read out and inputted into the terminal unit by the instruction of the CPU portion.

Then, the salesperson in charge inputs at least the merchandise code and the transaction code of the cellular phone through the second input means. The input means is for example a button input means, and as shown in FIG. 5, buttons (a, b, c, d, e) are manually pushed for the inputting. As already described, a to e may be a touch panel.

In the present invention, "merchandise code" refers to a code prescribing classification of the merchandise (e.g., face values such as 1,000 yen, 3,000 yen, 5,000 yen, etc., a call rate or a call time length).

As shown in FIG. 5 for example, a and b indicate buttons for inputting transaction codes, and for example, a indicates a settlement button, and b indicates a cancel button. Further, c to e indicate amount buttons, and for example, c corresponds to 1,000 yen, d corresponds to 3,000 yen, and e corresponds to 5,000 yen. Further, z indicates a button, for example, for payment for a bill when the cellular phone is used as a membership card as will be explained later.

When a customer designates a call rate covering 5,000 yen and effects payment for the amount, the salesperson in charge pushes button e (5,000 yen) and pushes the settlement button a that confirms payment and receipt of the amount, whereby final transaction information data of the merchandise code, the transaction code, etc., are inputted to constitute final transaction information. When the cancel button b is thereafter pushed, the input operation can be started all over again.

In the above manner, the identification number of the connection telephone company, the identification number for identifying the phone user (user ID), the merchandise code and the transaction code ("merchandise information" hereinafter), inputted into the store processing terminal unit through the first and second input means, are received and stored in the RAM portion of the storage means 37 shown in FIG. 3. As already explained, the ROM portion of the storage means 37 has the identification code (terminal ID) of the above store processing terminal unit pre-registered therein.

The central control means 38 not only constructs a electric data text L for a POS terminal, to be outputted to the POS terminal 40, on the basis of the above stored merchandise information, but also constructs a electric data text M of the merchandise information and the identification code of the terminal to be sent out to the management host computer 100.

The electric data text L for a POS terminal is outputted to the POS terminal 40 through the POS output means 39, and the electric data text M of the merchandise information and the identification code of the terminal, to be sent to the host computer, is sent out through the communication control means 41 and through a communication line. Preferably, the above electric data text of the merchandise information, etc., is sent out upon inputting of final transaction information, for example, through the settlement button. The sent-out electric data text M of the merchandise information, etc., is received and stored in the host computer of the connection telephone company.

The POS terminal gives the customer the result of the above transaction in the form of a printout slip or receipt. Preferably, the store processing terminal unit and the POS terminal are connected to each other, for example, with a two-way connector, and a generally used barcode reader and the above processing terminal unit are connected to the POS terminal in parallel. The above embodiment is mainly concerned with claim 3.

Figure 4:
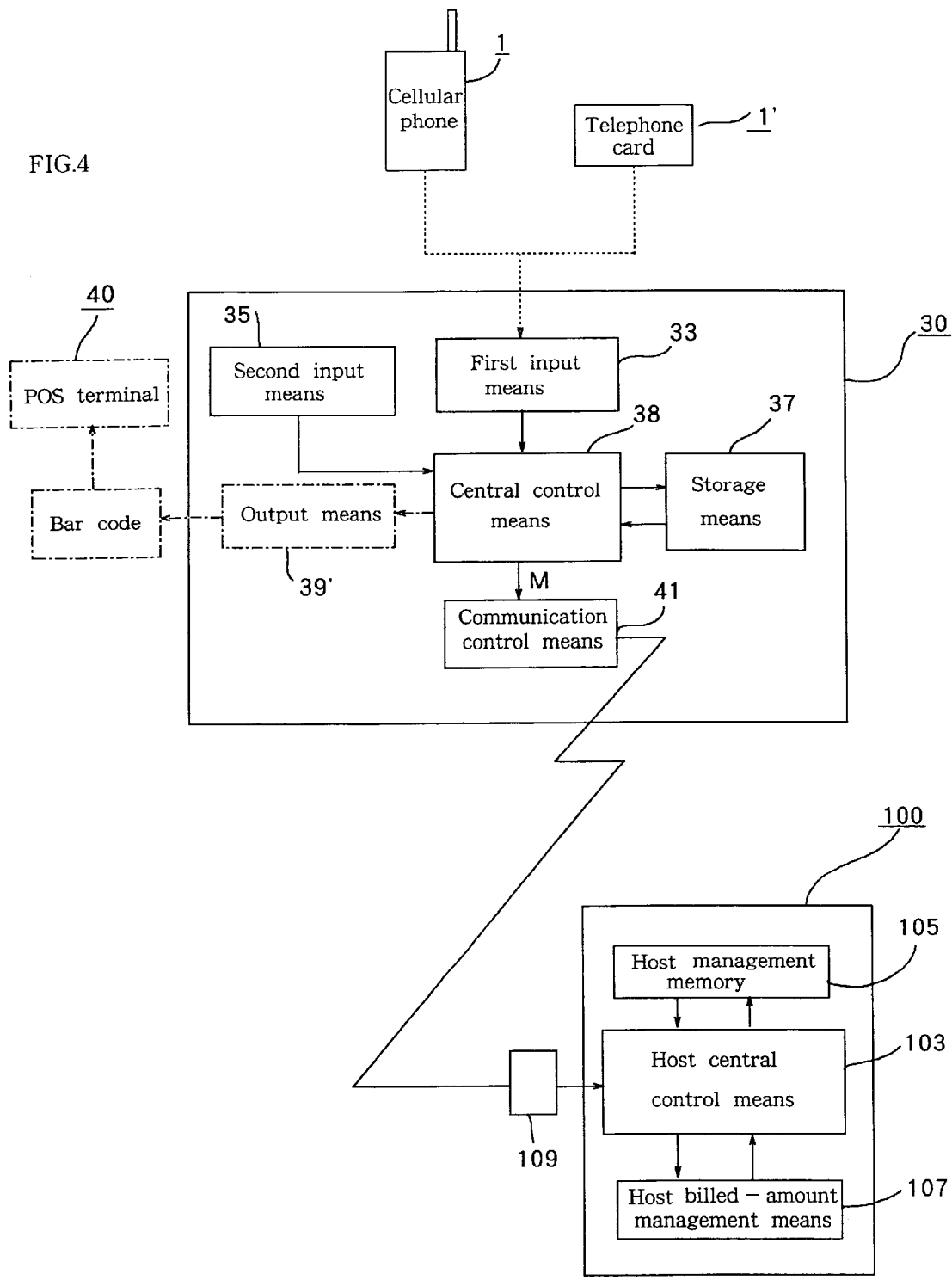
FIG. 4 is a block diagram showing another constitution of the store processing terminal unit.

In another embodiment of the present invention, the above terminal processing unit has no output means to the POS terminal as shown in FIG. 4.

In this embodiment, there is used a means for displaying a barcode that is specified by the merchandise code and the identification number of the connection telephone company. As means for displaying a barcode, for example, there is provided a table showing barcodes specified by merchandise codes and the identification number of the connection telephone company (merchandise/barcode table), and the salesperson in charge allows a barcode reader to read a barcode corresponding, for example, to 5,000 yen in the table, to put the data in the POS terminal. The above embodiment is mainly concerned with claim 1.

In still another embodiment, the terminal processing unit has an output means 39' for outputting data of a merchandise code as shown in FIG. 4, and the output means outputs a barcode specified by a merchandise code and the identification number of the connection telephone company. The above barcode may be printed out on a printing medium such as paper in the form of a hard copy, or may be displayed on a screen of a display means such as CRT or LCD. The salesperson in charge similarly allows the barcode reader to read the above barcode information to put the data in the POS terminal. The above barcode may be a symbolized code made of OCR characters, MICR characters or a Caltra code in addition to a so-called barcode. In this case, the barcode reader includes a reader that can read such a code. This embodiment is mainly concerned with claim 2.

The cellular phone for use in the present invention has at least the identification numbers for identifying the connection telephone company and the phone user, pre-registered in the ROM portion thereof. In principle, these data are read out by the instruction of the CPU portion to be loaded by the first input means of the store processing terminal, or when a call is made, the identification numbers are read out from the ROM portion by the instruction of the CPU portion and imparted to the control information of the call to be sent out. There may be employed a cellular phone system in which an IC card is provided, the card having, pre-registered, the identification numbers of the connection telephone company and the phone user, and the IC card is fitted to a predetermined position of a cellular phone. In this case, the IC card is connected to the terminal unit in place of the cellular phone in FIG. 3, and the registered information of the IC card is loaded through the first input means. Such an IC card has an advantage that said card alone is carried and it can be fitted to another cellular phone as required for use. Further, there may be employed a terminal device in place of the IC card having the similar functions and is removable from a cellular phone. Further, the above IC card may have a memory device other than a so-called IC chip.

As described above, the cellular phone that is referred to in the present invention should be interpreted in a broadest sense, and the cellular phone in the present invention naturally includes a cellular phone itself and also includes a "cellular phone system" having a cellular phone and a peripheral device such as an IC card or a removable terminal device. In this case, it is sufficient to carry out the operation of registering of the identification numbers, etc., not in the phone itself but in the above system, and the connection to the processing terminal unit may be conducted by connecting the IC card or the like as a component of the system.

As described above, a removable IC card having, pre-registered, the identification numbers for identifying the connection telephone company and the phone user can be used in place of the cellular phone.

Naturally, the telephone call that the present invention aims at is not limited to a domestic phone call, and it includes an international call.

In another embodiment of the present invention, the identification numbers for identifying the connection telephone company and the phone user are registered in advance like the removable IC card. In this embodiment, however, besides the card that is fitted to the cellular phone, there may be employed a system using a telephone card that can be used not only with the cellular phone but also with other telephones such as PHS, a subscriber's telephone and a public telephone.

As will be discussed in detail later, a system using the cellular phone and a system using a telephone card are essentially the same in view of a technical conception, which involves the construction of "a telephone charge management file system in the store processing terminal unit and the management host computer connected thereto through a network" and can be constructed as an essentially the same telephone charge management system, so long as the systems include, as an essential component, a device, a unit or a medium having the pre-registered or pre-recorded identification numbers for identifying the connection telephone company and the phone user.

That is, the above telephone card can be handled as being essentially the same as the above cellular phone in that at least the identification numbers for identifying the connection telephone company and the telephone user are registered in advance.

Figure 13:
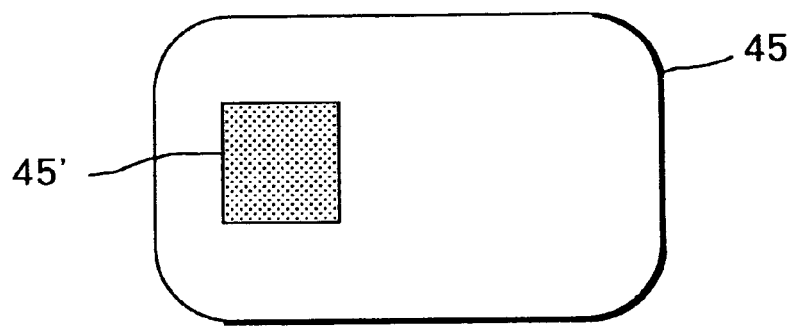
FIG. 13 is a drawing for showing telephone card examples.
Figure 13:
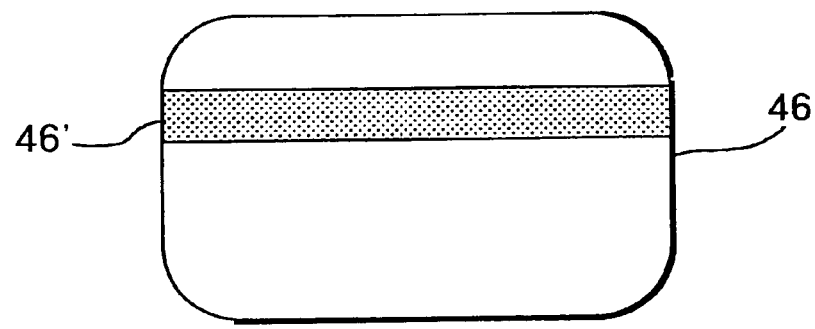
Figure 13:
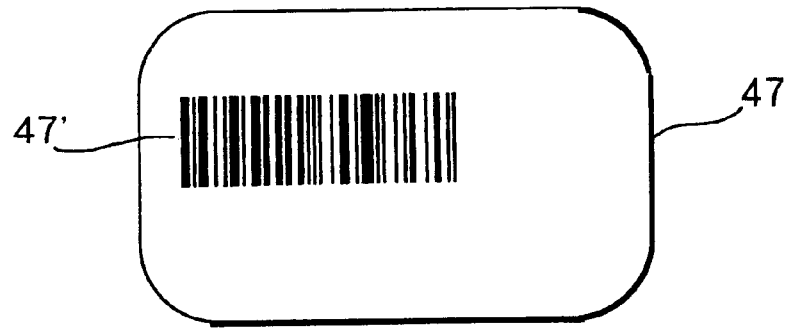

The above system using the telephone card differs only in that the first input means in the terminal processing unit in FIG. 3 reads the identification numbers from the above telephone card 1' instead of reading them from the cellular phone 1 to load them. The telephone card may be any one of an IC card 45, a magnetic card 46 and a barcode card 47 as shown in FIG. 13. Further, the telephone card can be a combination card using a combination of the above recording methods, and it can be another card based on other recording method.

The identification numbers for identifying the connection telephone company and the phone user is recorded in an IC chip module 45', a magnetic stripe 46' or a barcode portion 47' depending upon the type of the card. The hardware of the first input means is modified as required depending upon the type of the card from which the above data is read out. In the IC chip module, the first input means is constituted of a reader/writer that can read the data while it is in contact thereto, or that can read the data with an antenna while it is out of contact, preferably, by emitting an electric wave at 13.56 MHz or the like. Similarly, in the magnetic stripe, the input means is a magnetic head, and the head magnetically reads the identification numbers while it is in contact or comes near. In the barcode, a barcode reader optically reads the data.

As explained above, when the telephone card is used, the reading and loading of the identification numbers for identifying the connection telephone company and the phone user are operated completely in the same manner as in the reading and loading when the cellular phone is used.

Claim 4 that recites an embodiment using the telephone card (embodiment wherein the terminal processing unit has no output means to the POS terminal) corresponds to claim 1 that recites the embodiment using the cellular phone, and claim 5 that recites an embodiment using the telephone card (embodiment wherein the terminal processing unit has the output means 39' for outputting data of a merchandise code) corresponds to claim 2.

In another embodiment using the telephone card, not only the identification numbers but also a merchandise code is recorded in the telephone card, the merchandise code is loaded with the first input means together with the identification numbers, and the transaction code alone is button-inputted with the second input means. This embodiment refers to an embodiment specified in claim 7.

In the above case, the "means for displaying a barcode that can be read with the POS terminal" may be a means for directly reading not only the above "merchandise/barcode table" but also a barcode of a card type (e.g., amount of 5,000 yen, 3,000 yen, 1,000 yen or the like) (that is printed) on the telephone card itself with the barcode reader and putting the read data in the POS terminal.

While the above explanation refers to the card of 5,000 yen, 3,000 yen or the like, it should be noted that the telephone card in the present invention only specifies such an amount and has no properties of cash voucher unlike a so-called telephone card.

(Transaction Using Store Processing Terminal Unit of Other Type)

While the above operation is an example of the input operation conducted by the salesperson in charge, a customer can carry out the transaction by conducting the above transaction on the touch panel of an interactive store processing terminal unit with which the customer himself or herself operates the touch panel.

When the above interactive terminal unit is used, the unit may be a terminal unit specialized for the transaction with the cellular phone 1 or the telephone card 1', or it may be a so-called multi-media terminal unit that has other functions in addition to the function of the transaction with the cellular phone or the like. That is, the above unit may be provided with the functions of sale and rewriting of video game programs and reservations of tickets for music concerts and movies and travelers' tickets and facilities in addition to the function of transaction with the cellular phone and the like.

(Case of ATM Terminal)

The store processing terminal unit for use in the present invention may have the function of an automatic teller machine in addition to the above interactive function, as will be discussed in detail below.

The automatic teller machine (to be referred to as "ATM" hereinafter) is a machine that automatically permits a customer to deposit money in a bank, draw out money from a bank, transfer money to another's bank account and do some other transactions. Generally, the above operation is conducted using a bank card (to be simply referred to as "card" hereinafter) and/or a bankbook. The above "bank" is not limited to a so-called bank (bank licensed under the Banking Law), and it includes financial agencies in a broad sense such as a nonbank, a credit card company, a leasing company, and the like.

Figure 8:
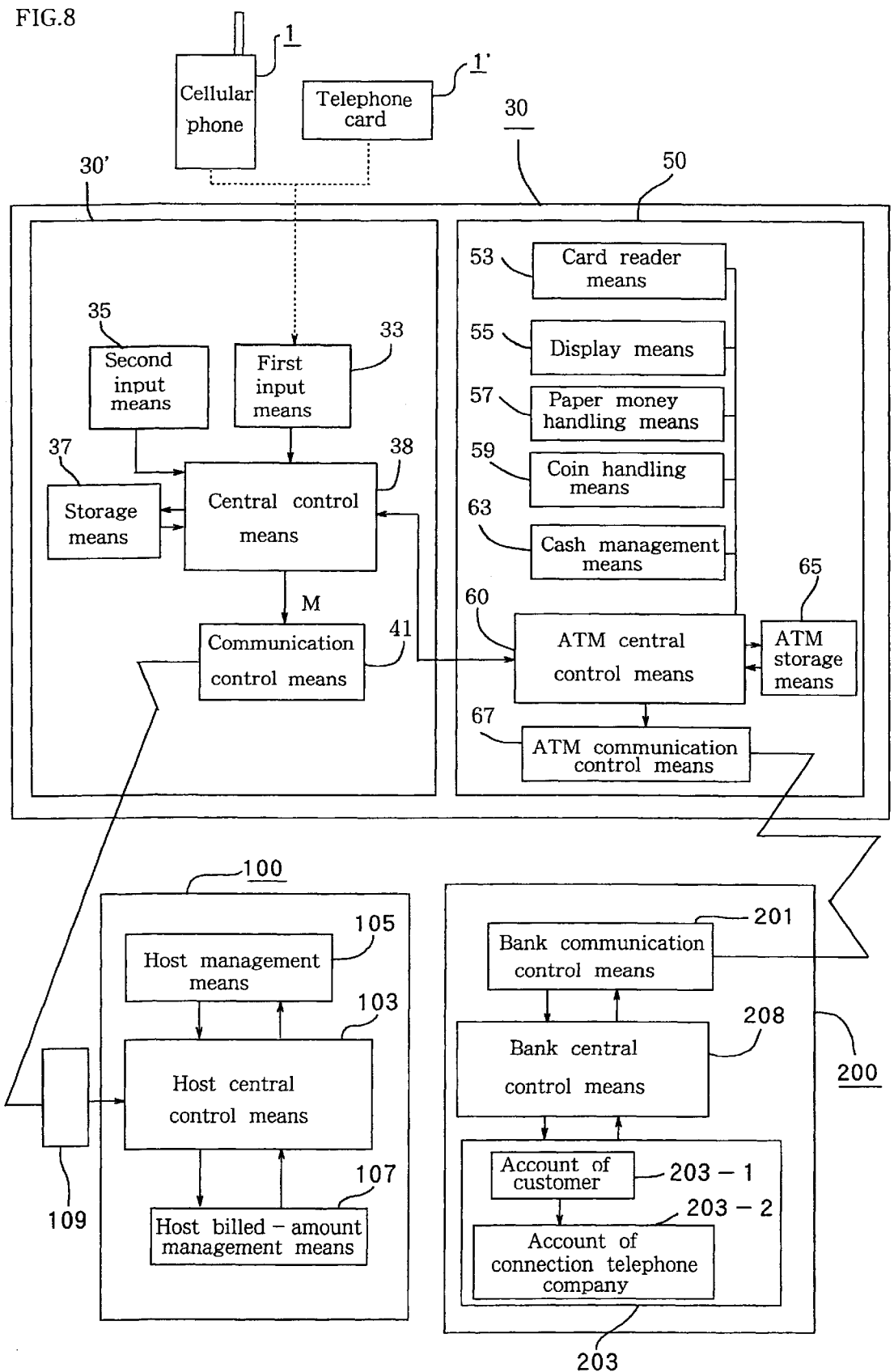
FIG. 8 is a block diagram of a store processing terminal unit having an ATM terminal.
Figure 9:
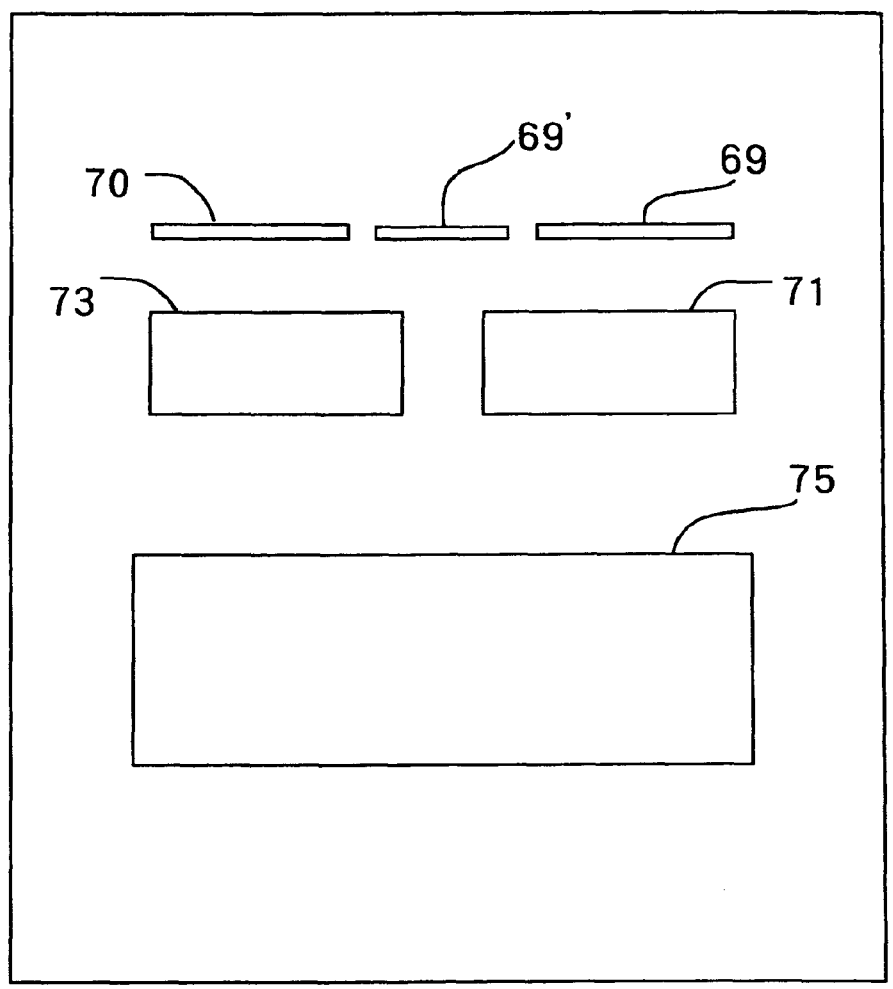
FIG. 9 is a front view of the ATM unit.

FIG. 8 is a block diagram showing the constitution of the store processing terminal unit having the ATM terminal, and FIG. 9 is a front view of the ATM unit.

In this case, the store processing terminal unit 30 is composed of a terminal unit 30' and an ATM unit 50 as shown in the block diagram of FIG. 8.

Differing from the store processing terminal unit 30 shown in FIG. 3, the terminal unit 30' is not necessarily required to be connected to the POS terminal, and in this case, it does not have the POS output means for outputting the electric data text of a merchandise code to the POS terminal as shown in the drawing.

The above ATM unit has a constitution and a function, which are in principle the same as those of a conventional ATM. That is, generally, it comprises a card reader means 53, a display means 55, a paper money handling means 57, a coin handling means 59, an ATM central control means 60, a cash management means 63, an ATM storage means 65 and an ATM communication control means 67. Further, it may have a slip preparation means, a bankbook printing means, and the like.

As shown in FIG. 9, like a general ATM unit, the front of the ATM unit for serving customers is provided with a card insertion slot 69, a bankbook insertion slot 70, a paper money in and out port 71, a coin in and out port 73, a touch panel display portion 75, and the like. Further, 69' shows a slot for inserting a bill, etc., as will be discussed later.

The card reader means 53 is for reading data, for example, from the recorded portion (magnetic stripe) of a magnetic card inserted through the card insertion slot 69 and for writing the data.

The display means 55 is for allowing the touch panel display portion 75 to show guidance for a customer and allowing it to show a touch panel on which a type of the transaction and an amount are displayed for selection and inputted.

The paper money handling means 57 and the coin handling means 59 are for discriminating and counting paper money and coins inserted through the paper money in and out port 71 or the coin in and out port 73 to receive them and for taking out a predetermined number of paper money and coins that are placed beforehand, to pay them back through the paper money in and out port and the coin in and out port.

The ATM central control means 60 is for integrally controlling the card reader means 53, the display means 55, the paper money handling means 57, the coin handling means 59 and the cash management means 63 that manages various information of receipt and payment of cash, according to a management program stored in the ATM storage means 65. Further, a result of the transaction is recorded in the above ATM storage means 65.

The ATM central control means 60 of the ATM unit 50 and the central control means 38 of the store processing terminal unit 30' are connected to each other and can exchange information processed in these units. Further, it is not required to provide the central control means 38 of the terminal processing unit and the ATM central control means 60 of the ATM unit as separate ones, and these may be integrally constituted as one central control means.

The ATM unit 50 is connected to a management host computer 200 of the bank through a communication line and a bank communication control means 201 with its ATM communication control means 67. As shown in the block diagram of FIG. 8, the above management host computer comprises the bank communication control means 201, an account management file 203 and a bank central control means 208.

In the account management file 203 of the bank, preferably, a customer's account 203-1 and a connection telephone company account 203-2 are opened, and desirably, the management operation of these data is conducted with the bank central control means 208 together with the management of the bank communication control means 201.

The process of transaction will be explained with reference to flow sheets shown in FIGS. 10 and 11.

In principle, the ATM terminal can equally handle the case using the cellular phone and the case using the telephone card. The following explanation therefore employs "cellular phone (telephone card)", which stands for a cellular phone or a telephone card.

First, a customer selects a transaction on the cellular phone (telephone card) (Step S100), and he or she selects a type of the transaction on the cellular phone (telephone card) (Step S101). In the transaction, one of, for example, ① Application to telephone charge management system (new purchase of telephone call fee), ② Reloading (re-purchase) of telephone call fee and ③ Payment for bill is selected on a menu screen.

First, the ① Application to telephone charge management system (new purchase of telephone call rate) will be discussed below, and the ② Reloading (re-purchase) of telephone call fee and ③ Payment for bill will be discussed later.

When ① Application to cellular phone rate management system is selected in Step S101, the display screen changes to an amount selection screen, and for example, 5,000 yen is selected on a touch panel (Step S102).

In FIG. 8, when the external connection terminal of the cellular phone 1 and the connection terminal of the processing unit are connected to each other, the identification numbers for identifying the connection telephone company and the user, registered in the ROM portion of the cellular phone are read and loaded through the first input means 33, and the selected amount of 5,000 yen is loaded through the second input means 35, and these data are stored in the storage means 37 in the store processing unit 30'. In the case of the telephone card 1', loading is similarly carried out through the first input means depending upon the type of the card (an IC card, a magnetic card or a barcode card).

The display screen changes to a confirmation screen requesting the customer to confirm whether or not to pay 5,000 yen as a call rate in the telephone charge management system (Step S103), and when the payment is confirmed (accepted), the display screen shifts to a payment step P (Step S104). The payment step is carried out in the ATM unit.

Figure 11:
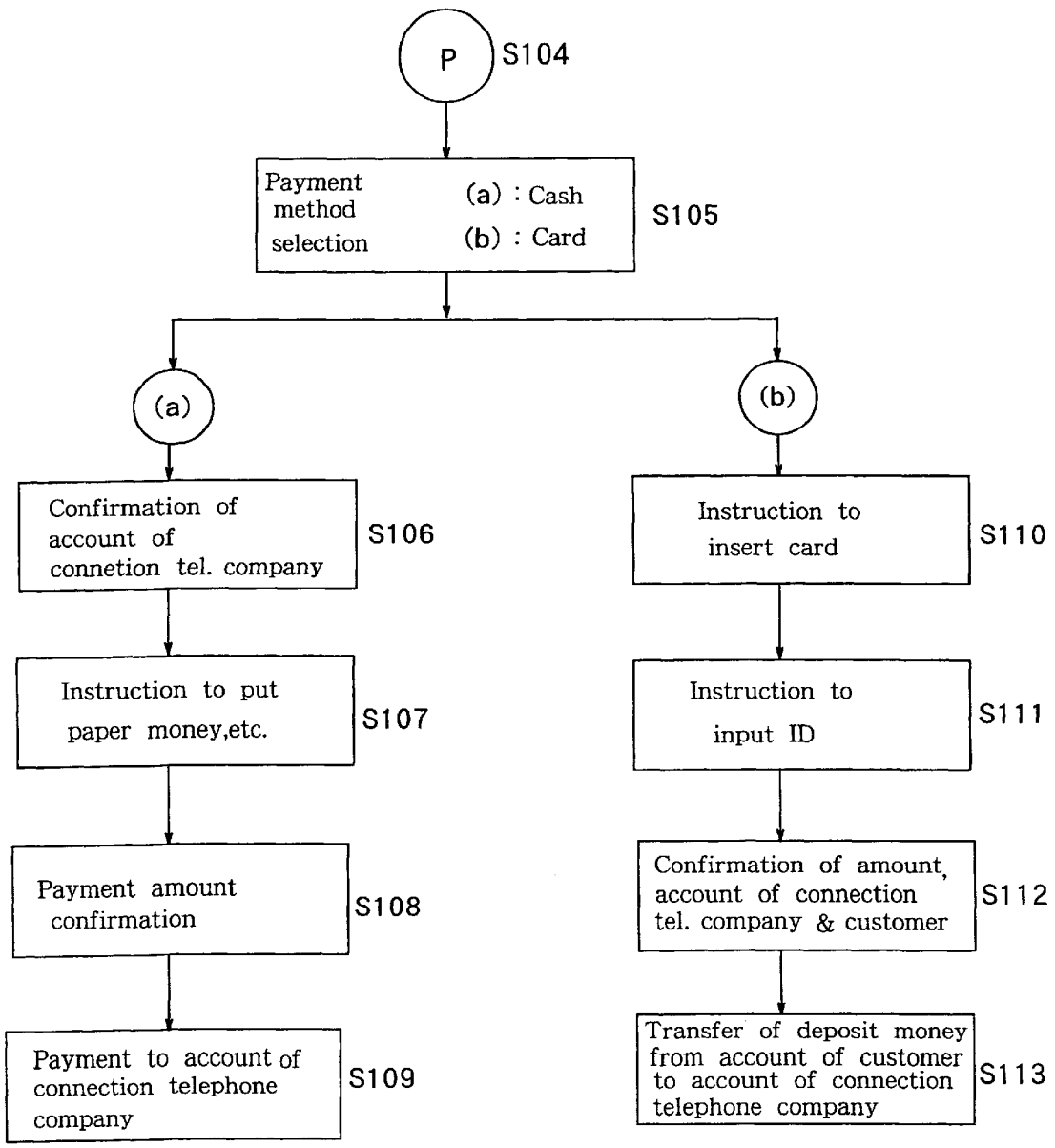
FIG. 11 is a flow sheet showing the process of transaction of a cellular phone etc. through the ATM unit.

As shown in FIG. 11, on a payment method selection screen (Step S105), it is requested to select, for example, payment by cash (a) or payment by a card (b).

The payment by cash (a) refers to a method in which the cash is transferred to the account No. 203-2 of the connection telephone company, and the payment by a card (b) refers to a method in which the corresponding amount is transferred from the customer's account No. 203-1 to the account No. 203-2 of the connection telephone company.

When the payment by cash (a) is selected, the screen displays the account of the connection telephone company for the customer to confirm the same (Step S106), and he or she follows the instruction to deposit paper money, etc., (Step S107), confirms the payment amount (Step S108) and effects the payment through the paper money handling means 57, and the like. The above data is sent to the management host computer 200 of the bank that is connected to the above ATM unit 50 through a line, and the above amount is transferred to the account No. 203-2 of the connection telephone company (Step S109).

The ATM central control means 60 shown in FIG. 8 receives a reply that the transfer is completed, through the line from the bank communication control means 201, and this information is sent to the central control means 38 of the store processing terminal unit 30'.

The central control means 38 constructs a electric data text M of the merchandise information and the identification code of the terminal to be sent to the management host computer 100 of the connection telephone company. The above text is sent through a communication line with the communication control means 41, received and stored in the host computer of the connection telephone company and processed thereafter, as has been explained already.

On the other hand, when the payment by a card (b) is selected in FIG. 11, a card is inserted and a PIN (personal identification number) is inputted according to the instructions to insert the card (Step S110) and input the PIN number (ID) (Step S111).

The display screen shows the amount of purchase, the account of the connection telephone company and the account of the customer, to request him or her to confirm the same (Step S112), and upon confirmation thereof, the amount (5,000 yen in this embodiment) is transferred from the account of the customer to the account of the connection telephone company (Step S113).

Similarly to the transaction by cash, the ATM central control means 60 shown in FIG. 8 receives a reply that the transfer is completed to the account No.203-2 of the connection telephone company, and this information is sent to the central control means of the store processing terminal unit 30'. The above central control means constructs a electric data text M of the merchandise information and the identification code of the terminal to be sent to the management host computer 100 of the connection telephone company. The above text is sent through a communication line with the communication control means 41, and received and stored in the host computer of the connection telephone company.

(Management File in Management Host Computer)

FIG. 6 shows one example of a data storage format, stored in the memory of the host computer. For example, the data is stored as a "cellular phone (telephone card) user ID registration file". That is the format of the user ID registration file.

The above file is composed, for example, of a terminal ID area, a user ID area and merchandise code area. In the example of No. 1 in the drawing, a terminal ID data ("A-0001") is written in the terminal ID area, a user ID ("81#11000772894#") is written in the user ID area, and merchandise code ("5000") is written in the merchandise code area.

In the host computer, preferably, each user ID has a "billed-amount management file" having a format shown in FIG. 7, for managing the billing when each of registered users uses the cellular phone (telephone card). In the drawing, the file corresponds to the user ID "81#11000772894#", and it shows, for example, a remaining amount of 5,000 yen at the time of registration (No. 1).

For keeping the confidentiality of the merchandise information data communication through the above communication line, preferably, the information data M is encrypted. In this case, preferably, the above communication control means 41 in FIG. 3 has means for encrypting an electric text to the management host computer and sending the same out, and the host computer has an interface portion 109 for receiving the encrypted electric text sent from the above communication control means and decrypting the same. Specifically, an encryption/decryption program is stored in a hard disk of the communication terminal of the communication control means and the interface portion or in a storage device such as an expansion board, the information data M that is a plain text is encrypted in, and sent out in the form of an encrypted text through the communication control means that is a transmission terminal, and the encrypted text is received and decrypted in the above interface portion that is a receiving terminal. An IC card specialized for encryption/decryption may be connected to the above terminals. The management host computer may have the communication control means, and the above interface portion may be included therein.

The communication line may be a leased line or a switched line. When it is an switched line, it is sufficient for fully attaining the above object to use a public telephone line which uses a voice frequency band of 300 to 3,400 Hz. Further, an integrated services digital network (ISDN) line may be used instead of the above analog line. For using the former analog line, naturally, the communication control means and the interface portion are required to have a modem (modulation-demodulation unit), and in the latter digital line, DSU (digital service unit) and TA (terminal adaptor) are required in place of the modem.

When the above communication line is used to send merchandise information data from the store processing terminal unit 30 to the management host computer 100 of the connection telephone company, there may be employed a means in which an operational management computer 109' is provided as shown in FIG. 3 and the merchandise information data is sent through the above computer. If the present system includes a plurality of connection telephone companies and when individual management host computers 100', 100", 100''', . . . are provided, the operational management computer 109' recognizes the identification number of each connection telephone company, selects the host computer of the corresponding telephone company and classifies merchandise information data signals to send it out.

(Telephone Charge Management When the Cellular Phone is Used)

The operation when a user used the cellular phone will be explained below with reference to FIG. 12.

When a telephone number of a person to whom a call is made is keyed in through the operation portion, etc., the CPU portion reads information of the identification numbers of the connection telephone company and a phone user (user ID) registered in the ROM portion, this information is then added to call control information, and they are converted to a radio signal and transmitted through the signal transmission/receiving portion.

Figure 12:
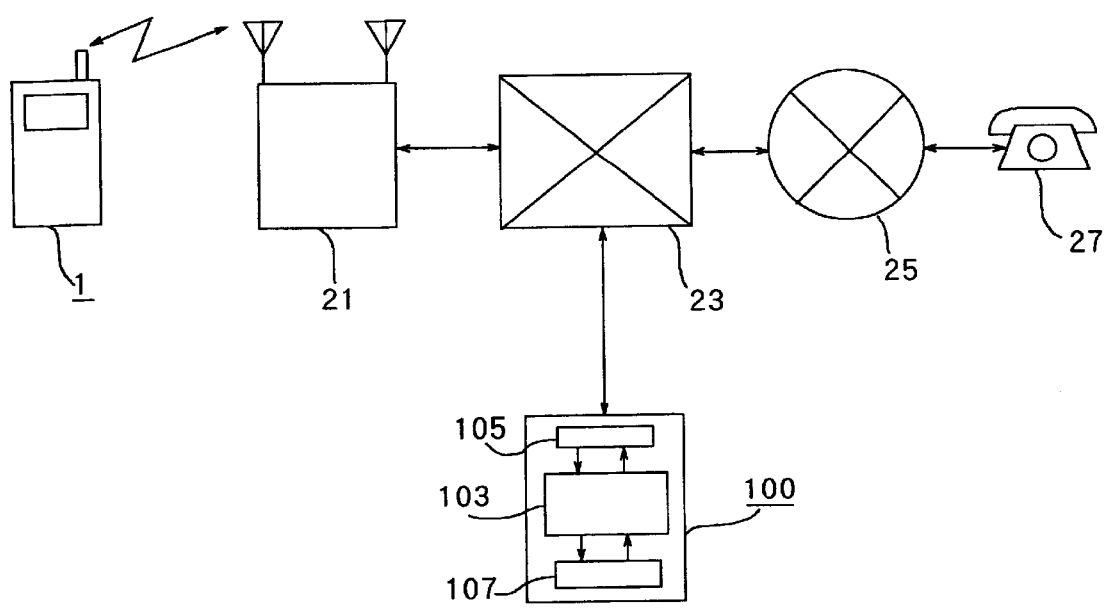
FIG. 12 is a drawing for explaining an operation using a cellular phone.

As shown in FIG. 12, the above radio signal including the identification number of the connection telephone company, transmitted from the cellular phone 1, is sent through a base station 21 of the connection telephone company covering the area and allows a switchboard 23 of the connection telephone company to operate.

The identification number for identifying the phone user (user ID) is sent to the management host computer 100 of the connection telephone company through the above switchboard 23. The central control means 103 of the host computer searches in the host management memory 105 storing the user ID. Specifically, the "user ID registration file" in FIG. 6 is opened, and the pertinent user ID is searched for. At the same time, the "billed-amount management file" made for the pertinent user ID in FIG. 7 is opened to check a billed-amount state of the pertinent user ID (remaining amount of prepaid call rate/remaining call time period). In the showing of FIG. 7, it is read that the user ID (81#11000772894#) now has a remaining amount of 3,150 yen as a remaining call time period.

The host computer 100 sends a voice message to the cellular phone, or causes the cellular phone to display characters on the display portion, through the above switchboard 23 and the base station 21, to inform the user using the cellular phone that the remaining amount for a remaining call time period is 3,150 yen, and the switchboard 23 makes line connection through a general telephone network 25.

The host central control means 103 of the host computer 100 detects a response of the terminal 72 of a person to which a call has been made, and starts the host billed-amount management means 107. The billed-amount management means conducts billing processing depending upon a time period for which the call is made, and after the call finishes, it records a telephone number of a person to whom the call was made (telephone number called up), a call time period, a billed amount (call charge) and a remaining call time period (remaining amount) in the "billed-amount management file" of the user ID. In this case, a final data may be overwritten on a management data, it is preferred to save a history as shown in FIG. 7 so that a management report can be issued at the request of the user or the like.

(Telephone Charge Management When Call is Made With Telephone Card)

When the telephone card is used, the telephone that is used therewith may be any one of a cellular phone, PHS (personal handy-phone system), a subscriber's telephone and a public telephone.

When a call is made with the telephone card, the user keys in the identification numbers for identifying the connection telephone company and the phone user (user ID, etc.) himself or herself regardless of which type of telephone is used. The above user ID, etc., may be printed on the card surface covered with a covering layer (cover) removable by scratching.

Some cellular phones automatically transmit the identification number of the connection telephone company, and in such a case, it is not necessarily required to input the identification number of the connection telephone company.

The use of the telephone card, for example, with a cellular phone will be explained. The cellular phone itself may be a general cellular phone, and for example, a cellular phone as shown in FIGS. 1 and 2 can be used. The phone user key-inputs the ID, etc., through the operation portion.

As is already discussed in the case using the cellular phone, The keyed-in information of the identification numbers for identifying the connection telephone company and the phone user is added to call control information, and these are then converted to a radio signal and transmitted through the transmission/reception portion. Then, similarly to the case as shown in FIG. 12, the switchboard 23 of the connection telephone company operates, the management host computer opens the user ID registration file corresponding to the user ID, and if a certain rate remains in the billed-amount file, the switchboard makes line connection. The above procedures are also true of the subscriber's telephone and the public telephone in that the user ID, etc., are keyed in to operate the switchboard of the connection telephone company and that line connection is made subject to a remaining certain balance in the billed-amount management file.

(Additional Purchase of Call Rate (Reloading))

When the host computer opens the "billed-amount management file" of the user ID to obtain data showing that the remaining call time period (remaining balance) is a certain value or less, e.g., 10 yen or less, the host computer informs the user of the telephone terminal to that effect, for example, by allowing the display portion to show the same, to request for an additional purchase of a call rate, instead of making line connection. In this case, the purchase (additional purchase (reloading)) of a call rate is conducted as follows.

In principle, it is sufficient to follow the same procedures as those in the first payment for a telephone charge with regard to the cellular phone or the telephone card.

That is, when received a request for an additional purchase of a call rate, the salesperson in charge connects the cellular phone 1 for which an additional call rate is to be purchased, to the interface 33' to the first input means 33 of the store processing terminal unit 30, to read and load the identification numbers pre-registered in the ROM portion thereof. In the case of telephone card 1', the identification numbers recorded in the IC chip module, the magnetic stripe or the barcode portion are loaded with the input means suited to the type of the card. As already described, the terminal identification code (terminal ID) for identifying the store is registered in the terminal unit.

Then, the salesperson in charge manually inputs the merchandise code and the transaction code by pushing buttons (a, b, c, d, e) of the second button input means shown in FIG. 5. When a call rate of 5,000 yen is paid, the salesperson in charge presses the button e (5,000 yen) and presses the settlement button a that represents receipt of the amount, whereby the merchandise code and the transaction code are inputted and constitute final transaction information.

According to the already explained process, the electric data text L for the POS terminal is outputted to the POS terminal 40 with the POS output means 39, and the electric data text M of the merchandise information and the terminal identification code is sent to the host computer through a communication line with the communication control means 41.

The host computer searches for the "billed-amount management file" of the above user ID, writes therein to the effect that a new payment (e.g., 5,000 yen) is made, adds it to the remaining balance and records a remaining total. For example, when a call rate of 5,000 yen is received in a state where the balance of the previous call rate is 1,000 yen, 6,000 yen for a remaining call rate is written in the "billed-amount management file".

(Reloading Through ATM Terminal)

The reloading can be also conducted through the ATM terminal.

The reloading (additional purchase) for the cellular phone through the ATM terminal will be explained below. For convenience, the reloading will be discussed with regard to the cellular phone, while the reloading with regard to the telephone card is conducted completely in the same manner.

Figure 10:
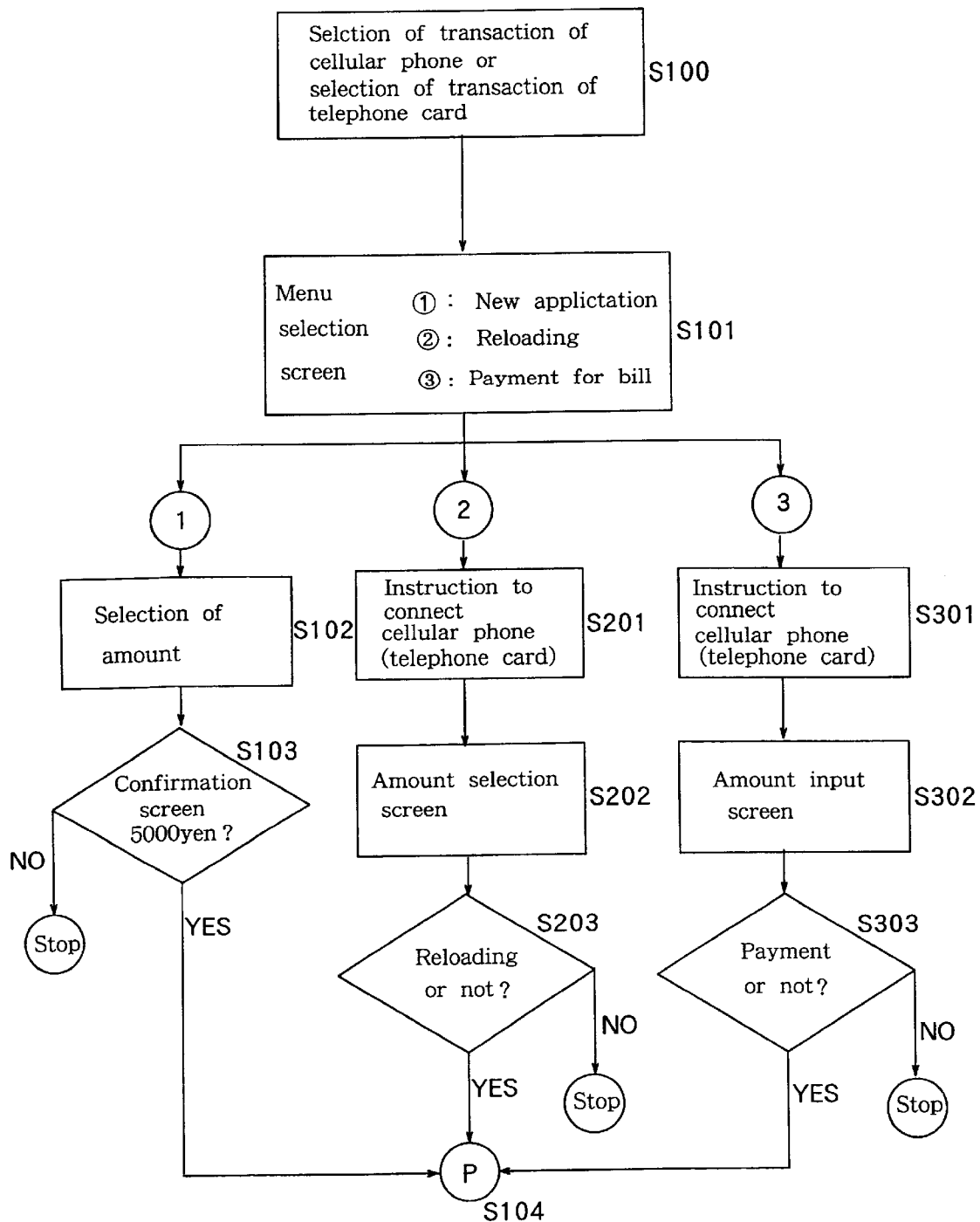
FIG. 10 is a flow sheet showing the process of transaction of a cellular phone etc. through the ATM unit.

In principle, in the same manner as in the application to new purchase, the ② reloading with regard to the cellular phone is selected in Step S101 in FIG. 10. According to the instruction to connect the cellular phone (Step S201), the cellular phone for which reloading is required is connected to the interface 33' of the first input means 33 of the store processing terminal unit 30', for example, by inserting the cellular phone through the insertion port provided in the terminal unit, whereby the identification numbers pre-registered in the ROM portion of the cellular phone are loaded. The display screen changes to an amount selection screen, and for example, 5,000 yen is selected on the touch panel (Step S202). The selected amount yen 5,000 is inputted in the second input means and stored in the storage means 37.

Thereafter, the display screen changes to a confirmation screen to request for a confirmation as to whether or not to reload 5,000 yen (Step S203), and if it is confirmed (accepted), the display screen shifts to the payment step P (Step S104). In the payment step P, the payment is effected through the ATM unit, and on the payment method selection screen (Step S105), the payment by cash (a) or the payment by a card (b) can be selected in the same manner as in the application to new purchase.

When received from the bank host computer a response to the effect that the payment to the account of the connection telephone company is completed, the ATM central control means 60 gives this information to the central control means 38 of the store processing terminal unit 30' as shown in FIG. 8, and the central control means constructs a electric data text M of the merchandise information and the identification code of the terminal, which information is to be sent to the management host computer 100 of the connection telephone company. The above text is sent out through a communication line with the communication control means 41 and received and stored in the host computer of the connection telephone company.

(Case of Membership Card)

The telephone charge management system has been explained with regard to cases using the cellular phone or the telephone card as a "fund card" hereinabove. The telephone charge management system, using the cellular phone or the telephone card as a "membership card" will be explained below.

In principle, the membership card is not different from the fund card. When the cellular phone or the telephone card is used as a membership card, the management host computer of the connection telephone company carries out addition processing of telephone charges to bill to the user depending upon the amount of call on the basis of information stored with regard to the issued user ID, and issue a bill of telephone charges to the user after a constant period of time.

And, the payment for the bill of the telephone charges is effected through the store processing terminal unit where the billed telephone charge can be paid with regard to the cellular phone or the telephone card.

(New Issue of Cellular Phone or Telephone Card)

Generally, a person who wishes to have the cellular phone or the telephone card issued as a membership card applies directly to the connection telephone company (including its special agent) therefor. The application is generally made in writing a subscriber's telephone number, etc., or it can be made by sign-up on the net of the connection telephone company.

The connection telephone company that receives the application issues the cellular phone (telephone card) that can be used as a membership card. The identification numbers for identifying the connection telephone company and the phone user (user ID) are pre-registered therein, and the newly issued cellular phone (telephone card) is sent to the applicant identified by the subscriber's telephone number, and the like.

The function of the above cellular phone (telephone card) itself is substantially the same as that of the already explained fund card, and call can be made through the switchboard of the connection telephone company. The membership card differs from the fund card only in that the host computer carries out addition processing of telephone charge amounts to bill depending upon telephone charges in the "billed-amount management file" of the user ID instead of carrying out deduction processing of prepaid telephone charge amounts depending upon telephone charges. Naturally, when a cellular phone system including an attachable IC card is used as a membership card, it will be apparent that the IC card is newly issued in place of the cellular phone itself.

(Payment of Telephone Charge)

As a result of addition processing of charges, a bill of telephone charges is to be issued to the user after a certain period of time. The charges can be paid through the store processing terminal unit used for purchase of fund cards in the store dealing such fund cards in the same manner as in the purchase.

The payment for the bill can be also made by reading and loading the bill through an insertion slot 69' nearly in the same manner as in the reloading. That is, when the ③ payment for a bill is selected in step S101 in FIG. 10, the procedures go through the instruction to connect the cellular phone (telephone card) (Step S301), inputting of an amount (Step S302) and confirmation (Step S303) to reach a payment step P, and the payment is effected.

Industrial Utility

In the present invention, telephone charges can be paid, for example, in a convenience store, or the like. When the charges are not received or the prepaid charge is deficient, therefore, the charges can be readily paid, and upon the payment, the store processing terminal unit transmits data of the payment to the management host computer to operate the billed-amount management file, so that the line-connection is made without delay to start a call.

In a conventional prepaid card having an ID number, the ID number is a large number or has a number of digits to dial, so that it is not so easy to dial such a number in. In the system of the present invention using the cellular phone, very conveniently, the ID number, etc., are pre-registered in the cellular phone.

Further, the present invention is remarkably effective for the management of an estimated-cost when the user is a corporation. That is, when a company as a legal entity obtains a plurality of user IDs to have salespersons, etc., who frequently make phone calls out of office use the cellular phones (or IC cards, etc., that are fitted when they are used in the cellular phone systems) as membership cards or telephone cards, the telephone company issues bills together with details to the company, so that a manager of the company can grasp to whom and how long calls were made by each salesperson (each user ID) exactly and clearly on the basis of the detailed contents. In this manner, the company can grasp all of the persons or companies to whom calls were made with regard to each user ID, so that employees substantially refrain from using the cellular phones or the telephone cards to make private calls.

Further, cellular phones are widely used in recent years, and many companies partly share payments of call charges of employees. Since, however, it is difficult to draw a clear line between charges for private calls and charges for company-related calls, which causes useless expenses. According to the present invention, however, employees can use the cellular phones of the present invention so long as their calls are company-concerned, so that a distinct line can be drawn between charges for private calls and charges for company-concerned calls. Obviously, therefore, there is no room where useless expenses are made, which is greatly significant for companies.

Differing from general telephone cards and general prepaid cards having ID numbers, the cellular phone (or IC card, etc., that is fitted when used in the cellular phone system) or the telephone card in the present invention has no cash voucher information written therein, so that it is not much necessary to take account of a risk of a loss caused by stealing, robbery or losing, and the management thereof is remarkably simplified. For example, large managing costs and excessive inventory costs that transportation company members and managers of convenience stores have paid are no longer necessary.

Moreover, managers are relieved from a conventional heavy mental burden, and the psychological effect thereof cannot be emphasized enough.

What is claimed is:

1. A telephone charge management system comprising a cellular phone having, pre-registered therein, at least identification numbers for identifying a connection telephone company and a phone user, and
 a store processing terminal unit placed in a store handling said cellular phone,
 wherein:
  said connection telephone company has a management host computer for storing and managing information on said cellular phone that is transacted,
  said store processing terminal unit and said host computer are connected to each other through a communication line, and further,
  said store has a point-of-sale (POS) terminal for managing merchandise transacted in the store,
  further wherein:
   said store processing terminal unit has, pre-registered, an identification code of said processing terminal and comprising
    a first input means for reading and loading said pre-registered identification numbers upon connection of said cellular phone thereto,
    a second input means for button-inputting a merchandise code and a transaction code,
    a storage means for storing merchandise information including said identification numbers, said merchandise code and said transaction code, inputted through the first and second input means,
    a central control means for constructing a electric data text of the merchandise information and the identification code of the terminal on the basis of said merchandise information stored, to be sent to said management host computer,
    a means for displaying a barcode that is specified by said merchandise code and the identification number of said connection telephone company and can be read with said POS terminal, and
    a communication control means for sending out a electric data text of the merchandise information and the identification code of the terminal to said management host computer to allow the management host computer to receive and store the electric data text,
   still further wherein:
    when a call is made with said cellular phone, said host computer carries out deduction processing of a prepaid call charge depending upon a call rate based on the stored merchandise information of said cellular phone.

2. The telephone charge management system of claim 1, wherein the communication control means encrypts the electric text to the management host computer and sends out the encrypted electric text.

3. The telephone charge management system of claim 1, wherein the communication line is a public telephone line.

4. The telephone charge management system of claim 1, wherein the cellular phone is used in a state where an IC card is fitted to the cellular phone, the IC card having, pre-registered, the identification numbers for identifying the connection telephone company and the phone user and the cellular phone and the store processing terminal unit are connected to each other by connecting said IC card.

5. A telephone charge management system comprising a cellular phone having, pre-registered therein, at least identification numbers for identifying a connection telephone company and a phone user, and
 a store processing terminal unit placed in a store handling said cellular phone,
 wherein:
  said connection telephone company has a management host computer for storing and managing information on said cellular phone that is transacted,
  said store processing terminal unit and said host computer are connected to each other through a communication line, and further,
  said store has a point of sale (POS) terminal for managing merchandise transacted in the store,
  further wherein:
   said store processing terminal unit has, pre-registered, an identification code of said processing terminal and comprising
    a first input means for reading and loading said pre-registered identification numbers upon connection of said cellular phone thereto,
    a second input means for button-inputting a merchandise code and a transaction code,
    a storage means for storing merchandise information including said identification numbers, said merchandise code and said transaction code, inputted through the first and second input means,
    a central control means for constructing a electric data text for the POS terminal and constructing a electric data text of the merchandise information and the identification code of the terminal to be sent to said management host computer, on the basis of said merchandise information stored,
    an output means for outputting the electric data text for the POS terminal, constructed in said central control means, in the form of a barcode that can be read with the POS terminal, and
    a communication control means for sending out the electric data text of the merchandise information and the identification code of the terminal to said management host computer to allow the management host computer to receive and store the electric data text,
   still further wherein:
    when a call is made with said cellular phone, said host computer carries out deduction processing of a prepaid call charge depending upon a call rate based on the stored merchandise information of said cellular phone.

6. A telephone charge management system comprising a cellular phone having, pre-registered therein, at least identification numbers for identifying a connection telephone company and a phone user, and a store processing terminal unit placed in a store handling said cellular phone, wherein:

said connection telephone company has a management host computer for storing and managing information on said cellular phone that is transacted, said store processing terminal unit and said host computer are connected to each other through a communication line, and further, said store has a point-of-sale (POS) terminal for managing merchandise transacted in the store, further wherein:

said store processing terminal unit has, pre-registered, an identification code of said processing terminal and comprising a first input means for reading and loading said pre-registered identification numbers upon connection of said cellular phone thereto, a second input means for button-inputting a merchandise code and a transaction code, a storage means for storing merchandise information including said identification numbers, said merchandise code and said transaction code, inputted through the first and second input means, a central control means for constructing a electric data text for the POS terminal, to be outputted to said POS terminal, and constructing a electric data text of the merchandise information and the identification code of the terminal, to be sent to said management host computer, on the basis of said merchandise information stored, a POS output means for outputting the electric data text for the POS terminal, constructed in said central control means, and a communication control means for sending out the electric data text of the merchandise information and the identification code of the terminal to said management host computer to allow the management host computer to receive and store the electric data text, still further wherein:

when a call is made with said cellular phone, said host computer carries out deduction processing of a prepaid call charge depending upon a call rate based on the stored merchandise information on said cellular phone.

7. A telephone charge management system comprising a telephone card having, pre-registered therein, at least identification numbers for identifying a connection telephone company and a phone user, and a store processing terminal unit placed in a store handling said telephone card, wherein:

said connection telephone company has a management host computer for storing and managing information on said telephone card that is transacted, said store processing terminal unit and said host computer are connected to each other through a communication line, and further, said store has a point-of-sale (POS) terminal for managing merchandise to be transacted in the store, further wherein:

said store processing terminal unit has, pre-registered, an identification code of said processing terminal and comprising a first input means for reading and loading said identification numbers recorded in said telephone card, a second input means for button-inputting a merchandise code and a transaction code, a storage means for storing merchandise information including said identification numbers, said merchandise code and said transaction code, inputted through the first and second input means, a central control means for constructing a electric data text of the merchandise information and the identification code of the terminal on the basis of said merchandise information stored, to be sent to said management host computer, a means for displaying a barcode that is specified by said merchandise code and the identification number of said connection telephone company and that can be read with the POS terminal, and a communication control means for sending out a electric data text of the merchandise information and the identification code of the terminal to said management host computer to allow the management host computer to receive and store the electric data text, still further wherein:

when a call is made on the basis of the identification numbers recorded in said telephone card, said host computer carries out deduction processing of a prepaid call charge depending upon a call rate based on the stored merchandise information of said telephone card.

8. The telephone charge management system of claim 7, wherein the merchandise code is further recorded in the telephone card, said merchandise code is loaded with the first input means together with the identification number, and the transaction code is button-inputted with the second input means.

9. The telephone charge management system of claim 7, wherein the telephone card is a card selected from an IC card, a magnetic card and a barcode card.

10. A telephone charge management system comprising a telephone card having, pre-registered therein, at least identification numbers for identifying a connection telephone company and a phone user, and a store processing terminal unit placed in a store handling said telephone card, wherein:

said connection telephone company has a management host computer for storing and managing information on said telephone card that is transacted, said store processing terminal unit and said host computer are connected to each other through a communication line, and further, said store has a point-of-sale (POS) terminal for managing merchandise to be transacted in the store, further wherein:

said store processing terminal unit has, pre-registered, an identification code of said processing terminal and comprising a first input means for reading and loading said identification numbers recorded in said telephone card, a second input means for button-inputting a merchandise code and a transaction code, a storage means for storing merchandise information including said identification numbers, said merchandise code and said transaction code, inputted through the first and second input means, a central control means for constructing a electric data text for the POS terminal and constructing a electric data text of the merchandise information and the identification code of the terminal to be sent to said management host computer, on the basis of said merchandise information stored, an output means for outputting the electric data text for the POS terminal, constructed in said central control means, in the form of a barcode that can be read with the POS terminal, and a communication control means for sending out the electric data text of the merchandise information and the identification code of the terminal to said management host computer to allow the management host computer to receive and store the electric data text, still further wherein:
when a call is made on the basis of the identification numbers recorded in said telephone card, said host computer carries out deduction processing of a prepaid call charge depending upon a call rate based on the stored merchandise information of said telephone card.

11. The telephone charge management system of claim 2, wherein the management host computer has an interface portion for receiving and decrypting the encrypted electric text sent out with the communication control means.

12. A telephone charge management system comprising a telephone card having, pre-registered therein, at least identification numbers for identifying a connection telephone company and a phone user, and a store processing terminal unit placed in a store handling said telephone card, wherein:
said connection telephone company has a management host computer for storing and managing information on said telephone card that is transacted, said store processing terminal unit and said host computer are connected to each other through a communication line, and further, said store has a point-of-sale (POS) terminal for managing merchandise to be transacted in the store, further wherein:
said store processing terminal unit has, pre-registered, an identification code of said processing terminal and comprising a first input means for reading and loading said identification numbers recorded in said telephone card, a second input means for button-inputting a merchandise code and a transaction code, a storage means for storing merchandise information including said identification numbers, said merchandise code and said transaction code, inputted through the first and second input means, a central control means for constructing a electric data text for the POS terminal, to be outputted to said POS terminal, and constructing a electric data text of the merchandise information and the identification code of the terminal, to be sent to said management host computer, on the basis of said merchandise information stored, a POS output means for outputting the electric data text for the POS terminal, constructed in said central control means, and a communication control means for sending out the electric data text of the merchandise information and the identification code of the terminal to said management host computer to allow the management host computer to receive and store the electric data text, still further wherein:
when a call is made on the basis of the identification numbers recorded in said telephone card, said host computer carries out deduction processing of a prepaid call charge depending upon a call rate based on the stored merchandise information of said telephone card.

13. A telephone charge management system comprising a cellular phone having, pre-registered therein, at least identification numbers for identifying a connection telephone company and a phone user, and a store processing terminal unit placed in a store where a billed telephone charge with regard to said cellular phone can be paid, wherein:
said connection telephone company has a management host computer for storing and managing information on said cellular phone that is issued, said store processing terminal unit and said host computer are connected to each other through a communication line, and further, said store has a point-of-sale (POS) terminal for managing merchandise transacted in the store, further wherein:
said store processing terminal unit has, pre-registered, an identification code of said processing terminal and comprising a first input means for reading and loading said pre-registered identification numbers upon connection of said cellular phone thereto, a second input means for button-inputting a merchandise code and a transaction code, a storage means for storing merchandise information including said identification numbers, said merchandise code and said transaction code, inputted through the first and second input means, a central control means for constructing a electric data text for the POS terminal, to be outputted to said POS terminal, and constructing a electric data text of the merchandise information and the identification code of the terminal, to be sent to said management host computer, on the basis of said merchandise information stored, a POS output means for outputting the electric data text for the POS terminal, constructed in said central control means, and a communication control means for sending out the electric data text of the merchandise information and the identification code of the terminal to said management host computer to allow the management host computer to receive and store the electric data text, still further wherein:
when a call is made with said cellular phone, said host computer carries out addition processing of a call charge to bill depending upon a call rate based on the information stored with regard to said cellular phone that is issued,
telephone charges to bill are billed to said user after a certain period of time, and
said billed telephone charges are paid in said store, followed by sending data of completion of the payment of the charges to said host computer from said store processing terminal unit.

14. The telephone charge management system of claim 13, wherein:
when a call is made with said cellular phone, said host computer searches for information stored with regard to said cellular phone issued on the basis of the identification number of said user and carries out addition processing of a call charge to bill depending upon a call rate,
telephone charges to bill are billed to said user after a certain period of time, and
said billed telephone charges are paid in said store, followed by sending data of completion of the payment of the charges to said host computer from said store processing terminal unit.

15. A telephone charge management system mainly comprising a telephone card having, pre-recorded therein, at least identification numbers for identifying a connection telephone company and a phone user, and
a store processing terminal unit placed in a store where a gilled telephone charge with regard to said telephone card can be paid,
wherein:
said connection telephone company has a management host computer for storing and managing information on said telephone card that is issued,
said store processing terminal unit and said host computer are connected to each other through a communication line, and further,
said store has a point-of-sale (POS) terminal for managing merchandise transacted in the store,
further wherein:
said store processing terminal unit has, pre-registered, an identification code of said processing terminal and comprising
a first input means for reading and loading said identification numbers recorded in said telephone card,
a second input means for button-inputting a merchandise code and a transaction code,
a storage means for storing merchandise information including said identification numbers, said merchandise code and said transaction code, inputted through the first and second input means,
a central control means for constructing a electric data text for the POS terminal, to be outputted to said POS terminal, and constructing a electric data text of the merchandise information and the identification code of the terminal, to be sent to said management host computer, on the basis of said merchandise information stored,
a POS output means for outputting the electric data text for the POS terminal, constructed in said central control means, and
a communication control means for sending out the electric data text of the merchandise information and the identification code of the terminal to said management host computer to allow the management host computer to receive and store the electric data text,
still further wherein:
when a call is made on the basis of the identification numbers recorded in said telephone card, said host computer carries out addition processing of a call charge to bill depending upon a call rate based on the information stored with regard to said telephone card that is issued,
telephone charges to bill are billed to said user after a certain period of time, and
said billed telephone charges are paid in said store, followed by sending data of completion of the payment of the charges to said host computer from said store processing terminal unit.

16. The telephone charge management system of claim 15, wherein:
when a call is made on the basis of the identification numbers recorded in said telephone card, said host computer searches for information stored with regard to said telephone card issued on the basis of the identification number of said user and carries out addition processing of a call charge to bill depending upon a call rate,
telephone charges to bill are billed to said user after a certain period of time, and
said billed telephone charges are paid in said store, followed by sending data of completion of the payment of the charges to said host computer from said store processing terminal unit.

17. A telephone charge management system mainly comprising a cellular phone having, pre-registered therein, at least identification numbers for identifying a connection telephone company and a phone user, and
a store processing terminal unit, placed in a store handling said cellular phone, and includes an automatic teller machine unit having an automatic teller machine function,
wherein:
said connection telephone company has a management host computer for storing and managing information on said cellular phone that is transacted,
said store processing terminal unit and said host computer are connected to each other through a communication line, and
said automatic teller machine unit is connected to a host computer of a financial agency that manages the unit, through a communication line,
further wherein:
said store processing terminal unit has, pre-registered, an identification code of said processing terminal and comprising
a first input means for reading and loading said pre-registered identification numbers upon connection of said cellular phone thereto,
a second input means for button-inputting a merchandise code and a transaction code,
a storage means for storing merchandise information including said identification numbers, said merchandise code and said transaction code, inputted through the first and second input means, a central control means for constructing a electric data text of the merchandise information and the identification code of the terminal on the basis of said merchandise information stored, to be sent to said management host computer, and a communication control means for sending out a electric data text of the merchandise information and the identification code of the terminal to said management host computer to allow the management host computer to receive and store the electric data text, still further wherein:

when a call is made with said cellular phone, said host computer carries out deduction processing of a prepaid call charge depending upon a call rate based on the stored merchandise information of said cellular phone.

18. The telephone charge management system of claim 17, wherein an account of said connection telephone company is opened in the host computer of the financial agency.

19. A telephone charge management system mainly comprising a telephone card having, pre-recorded therein, at least identification numbers for identifying a connection telephone company and a phone user, and a store processing terminal unit, placed in a store handling said telephone card, and includes an automatic teller machine unit having an automatic teller machine function, wherein:

said connection telephone company has a management host computer for storing and managing information on said telephone card that is transacted, said store processing terminal unit and said host computer are connected to each other through a communication line, and said automatic teller machine unit is connected to a host computer of a financial agency that manages the unit, through a communication line, further wherein:

said store processing terminal unit has, pre-registered, an identification code of said processing terminal and comprising a first input means for reading and loading said identification numbers recorded in said telephone card, a second input means for button-inputting a merchandise code and a transaction code, a storage means for storing merchandise information including said identification numbers, said merchandise code and said transaction code, inputted through the first and second input means, a central control means for constructing a electric data text of the merchandise information and the identification code of the terminal based on said merchandise information stored, to be sent to said management host computer, and a communication control means for sending out a electric data text of the merchandise information and the identification code of the terminal to said management host computer to allow the management host computer to receive and store the electric data text, still further wherein:

when a call is made on the basis of the identification numbers recorded in said telephone card, said host computer carries out deduction processing of a prepaid call charge depending upon a call rate on the basis of the stored merchandise information of said telephone card.

20. A telephone charge management system mainly comprising a cellular phone having, pre-registered therein, at least identification numbers for identifying a connection telephone company and a phone user, and a store processing terminal unit, placed in a store where a bill of telephone charges with regard to said cellular phone can be paid, and includes an automatic teller machine unit having an automatic teller machine function, wherein:

said connection telephone company has a management host computer for storing and managing information on said cellular phone that is issued, said store processing terminal unit and said host computer are connected to each other through a communication line, and said automatic teller machine unit is connected to a host computer of a financial agency that manages the unit, through a communication line, further wherein:

said store processing terminal unit has, pre-registered, an identification code of said processing terminal and comprising a first input means for reading and loading said pre-registered identification numbers upon connection of said cellular phone thereto, a second input means for button-inputting a merchandise code and a transaction code, a storage means for storing merchandise information including said identification numbers, said merchandise code and said transaction code, inputted through the first and second input means, a central control means for constructing a electric data text of the merchandise information and the identification code of the terminal on the basis of said merchandise information stored, to be sent to said management host computer, and a communication control means for sending out a electric data text of the merchandise information and the identification code of the terminal to said management host computer to allow the management host computer to receive and store the electric data text, still further wherein:

when a call is made with said cellular phone, said host computer carries out addition processing of a call charge to bill depending upon a call rate based on the information stored with regard to said cellular phone that is issued, telephone charges to bill are billed to said user after a certain period of time, and said billed telephone charges are paid through the store processing terminal unit including an automatic teller machine unit having an automatic teller machine function, followed by sending data of completion of the payment of the charges to said host computer from said store processing terminal unit.

21. The telephone charge management system of claim 20, wherein an account of said connection telephone company is opened in the host computer of the financial agency.

22. A telephone charge management system mainly comprising a telephone card having, pre-recorded therein, at least identification numbers for identifying a connection telephone company and a phone user, and a store processing terminal unit, placed in a store where a bill of telephone charges with regard to said telephone card can be paid, and includes an automatic teller machine unit having an automatic teller machine function, wherein:

said connection telephone company has a management host computer for storing and managing information on said telephone card that is issued, said store processing terminal unit and said host computer are connected to each other through a communication line, and said automatic teller machine unit is connected to a host computer of a financial agency that manages the unit, through a communication line, further wherein:

said store processing terminal unit has, pre-registered, an identification code of said processing terminal and comprising a first input means for reading and loading said identification numbers recorded in said telephone card, a second input means for button-inputting a merchandise code and a transaction code, a storage means for storing merchandise information including said identification numbers, said merchandise code and said transaction code, inputted through the first and second input means, a central control means for constructing a electric data text of the merchandise information and the identification code of the terminal based on said merchandise information stored, to be sent to said management host computer, and a communication control means for sending out a electric data text of the merchandise information and the identification code of the terminal to said management host computer to allow the management host computer to receive and store the electric data text, still further wherein:

when a call is made using the identification numbers recorded in said telephone card, said host computer carries out addition processing of a call charge to bill depending upon a call rate on the basis of the information stored with regard to said telephone card that is issued, telephone charges to bill are billed to said user after a certain period of time, and said billed telephone charges are paid through the store processing terminal unit including an automatic teller machine unit having an automatic teller machine function, followed by sending data of completion of the payment of the charges to said host computer from said store processing terminal unit.

23. The telephone charge management system of claim 22, wherein:

when a call using said cellular phone is made or a call is made on the basis of the identification numbers recorded in said telephone card, said host computer searches for information stored with regard to said cellular phone or said telephone card that is issued, on the basis of the identification number of said user, and carries out addition processing of a call charge to bill depending upon a call rate, telephone charges to bill are billed to said user after a certain period of time, and said billed telephone charges are paid through the store processing terminal unit including an automatic teller machine unit having an automatic teller machine function, followed by sending data of completion of the payment of the charges to said host computer from said store processing terminal unit.

* * * * *